(12) United States Patent  (10) Patent No.: US 7,788,244 B2
Xu et al.  (45) Date of Patent: Aug. 31, 2010

(54) METHOD AND SYSTEM FOR COPYING A SNAPSHOT TREE

(75) Inventors: Xia Xu, Boise, ID (US); Aaron Lindemann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/888,581

(22) Filed: Jul. 31, 2007

(65) Prior Publication Data

US 2009/0037418 A1  Feb. 5, 2009

(51) Int. Cl.
*G06F 7/00* (2006.01)
*G06F 12/16* (2006.01)

(52) U.S. Cl. ........................ 707/704; 711/162

(58) Field of Classification Search .............. 707/202, 707/204, 206, 610, 704; 711/161, 162, 112
See application file for complete search history.

(56) References Cited

U.S. PATENT DOCUMENTS

| | | | | |
|---|---|---|---|---|
| 6,078,932 A * | 6/2000 | Haye et al. | ............. | 707/204 |
| 6,182,198 B1 * | 1/2001 | Hubis et al. | ............. | 711/162 |
| 6,212,531 B1 * | 4/2001 | Blea et al. | ............. | 707/204 |
| 6,823,436 B2 * | 11/2004 | Krishnamurthy | ............. | 711/170 |
| 6,895,415 B1 * | 5/2005 | Rezaul Islam et al. | ............. | 1/1 |
| 7,076,509 B1 * | 7/2006 | Chen et al. | ............. | 707/202 |
| 7,085,785 B2 * | 8/2006 | Sawdon et al. | ............. | 707/204 |
| 7,334,095 B1 * | 2/2008 | Fair et al. | ............. | 711/161 |
| 7,424,498 B1 * | 9/2008 | Patterson | ............. | 707/206 |
| 7,467,268 B2 * | 12/2008 | Lindemann et al. | ............. | 711/162 |

* cited by examiner

*Primary Examiner*—Hung T Vy

(57) ABSTRACT

Various embodiments of the present invention are directed to an instant snapshot-tree-copy operation that, when directed to an existing snapshot tree, generates a data-structure framework for a copy of the existing snapshot tree that can be immediately accessed while a background-copy process copies data from the existing snapshot tree to the copy snapshot tree. The background-copy process copies data from the existing snapshot tree to the copy snapshot tree in top-down fashion, from the source logical device through each of the snapshot logical devices. While copying each logical device, the background-copy process sequentially copies data-storage units from a corresponding logical device of the existing snapshot tree to the copy-snapshot-tree logical device, making sure to adjust chains of dependencies within the copy snapshot tree to reflect modifications to the snapshot copy tree that occur independently from the background-copy process. A host computer may immediately access the copy snapshot tree, both for READ and WRITE access, even before completion of the background-copy process.

18 Claims, 36 Drawing Sheets

| A | B | C | D | E | F | G | H | I | J | K | L |

$t = 1$

| A | B | C | X | Y | Z | G | H | I | J | M | N |

$t = 2$

| O | P | C | X | Y | Z | Q | R | S | T | U | V |

$t = 3$

| O | P | W | X | Y | Z | A | B | S | T | J | J |

METHOD AND SYSTEM FOR COPYING A SNAPSHOT TREE

TECHNICAL FIELD

The present invention is related to mass-storage systems that provide logical-device-based data-storage interfaces to accessing host computers that include snapshot operations and, in particular, to a method and system for providing an instant-copy operation for making a copy of a snapshot tree.

BACKGROUND OF THE INVENTION

Mass-storage devices and mass-storage systems have evolved, during the past 60 years, as rapidly and profoundly, if not more rapidly and profoundly, than computer processors and electronic memories. Initially, mass-storage devices were either incorporated within, or directly connected to, computer systems, for exclusive access by the computer systems in which they were included. Later, dual-ported mass-storage devices that could support connections to two or more computer systems were developed, in order to provide for more reliable data storage within multi-computer systems. Techniques for concurrent access to mass-storage devices by multiple computers were developed, as well as additional techniques for using redundantly stored data to increase the reliability and fault-tolerance of mass-storage devices. With the advent of computer networking, computer systems became capable of accessing remote mass-storage devices via servers that managed the mass-storage devices on behalf of accessing host computers. More recently, and continuing to the present time, autonomous mass-storage systems have been developed to allow computers to access the mass-storage systems directly through network communications. These autonomous mass-storage systems often feature redundant controllers and redundant internal communications paths, and store data redundantly according to one or more of the various RAID schemes to provide highly available and highly fault-tolerant data storage. Presently, there is a wide range of available mass-storage systems for use in computer systems and networked computer environments.

Mass-storage systems generally provide a logical-device-based data-storage interface to accessing host computers. Host computers create, store data to, and retrieve data from, logical devices. Each logical device comprises a set of consecutively-addressable data-storage units. For example, a logical device may be considered, by the host computer, as comprising a linear array of data blocks that include either a fixed or a variable number of bytes, words, or another smallest-granularity unit of data storage. Mass-storage systems also generally provide various management and administrative operations to host computers, including a snapshot operation. A snapshot operation generates a logical copy of the contents of a logical device at a fixed point in time. The logical copy is contained in a snapshot logical device. Once a snapshot operation has been directed to a logical device, the logical device may continue to be accessed by host computers and modified by WRITE operations. Should, at a future point in time, a host computer wish to restore the logical device to the data state at the point in time at which a snapshot operation was directed to the logical device, the host computer can direct a RESTORE command to the logical device, specifying the snapshot logical device that corresponds to the point in time or the time point. Snapshot operations can be issued, one after another, at fixed points in time in order to provide a set of potential restore points to allow a host computer to restore a logical device to the data state that the logical device had at any of the restore points represented by snapshot logical devices generated by the snapshot operations.

The set of snapshots, or snapshot logical devices, generated for a source logical device, along with the source logical device, together comprise a snapshot tree. A host computer can restore the source logical device to the data state that the source logical device had at any in point in time represented by a snapshot in the snapshot tree. In general, the snapshots in the snapshot tree are not full copies of the source logical device, but contain only differential data sufficient to restore the logical device to the data state at the time represented by the snapshot. The snapshots within the snapshot tree are generally interdependent, and often, during a restore operation, a number of different snapshots within the snapshot tree need to be accessed in order to restore the source logical device to a previous data state. The entire snapshot tree is therefore a rather complex set of interdependent, somewhat special types of logical devices. While current mass-storage systems provide snapshot and restore operations, current mass-storage systems do not provide a convenient means for managing the entire set of source and snapshot logical devices that together compose a snapshot tree. Researchers, developers, manufacturers, vendors, and users of mass-storage systems thus recognize a need to continue to develop and provide new and improved methods and systems for managing snapshot trees within a complex mass-storage system.

SUMMARY OF THE INVENTION

Various embodiments of the present invention are directed to an instant snapshot-tree-copy operation that, when directed to an existing snapshot tree, generates a data-structure framework for a copy of the existing snapshot tree that can be immediately accessed while a background-copy process copies data from the existing snapshot tree to the copy snapshot tree. In one embodiment of the present invention, he background-copy process copies data from the existing snapshot tree to the copy snapshot tree in top-down fashion, from the source logical device through each of the snapshot logical devices. While copying each logical device, the background-copy process sequentially copies data-storage units from a corresponding logical device of the existing snapshot tree to the copy-snapshot-tree logical device, making sure to adjust chains of dependencies within the copy snapshot tree to reflect modifications to the snapshot copy tree that occur independently from the background-copy process. A host computer may immediately access the copy snapshot tree, both for READ and WRITE access, even before completion of the background-copy process.

BRIEF DESCRIPTION OF THE DRAWINGS

FIGS. 7A-E illustrate a snapshot operation.

DETAILED DESCRIPTION OF THE INVENTION

The present invention is directed to a method and system for instant snapshot-tree copy within a mass-storage system. In a first subsection, below, an exemplary mass-storage system is discussed to provide a suitable foundation for the following discussion of the present invention. In the second subsection, details of the snapshot operation and snapshot trees are discussed, to complete the foundation information for discussion of the present invention. Finally, in a third subsection, embodiments of the present invention are discussed.

Mass-Storage Systems

Figure 1A:
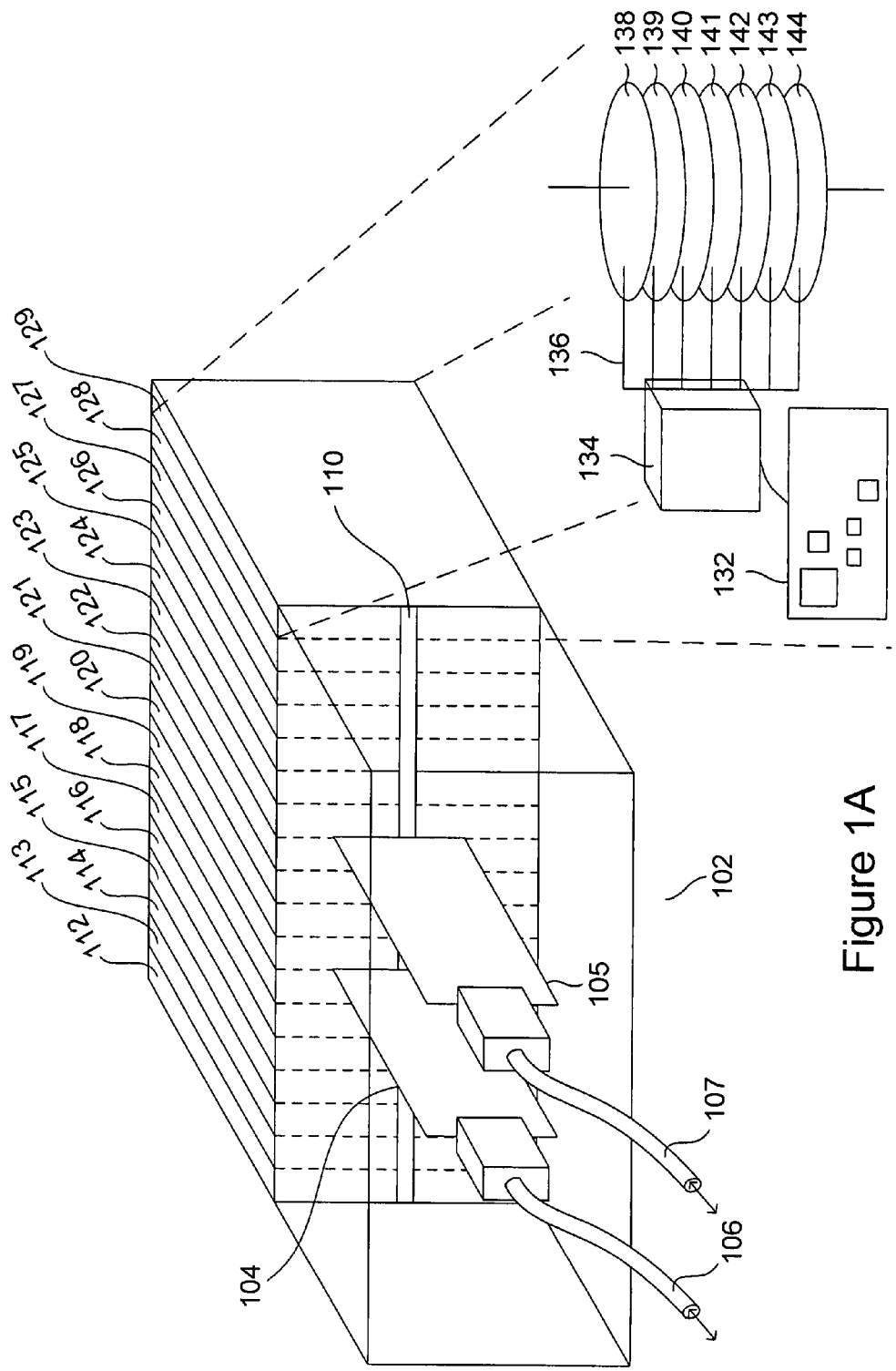
FIG. 1A illustrates, at an abstract level, an autonomous mass-storage system, often referred to as a "disk array."

FIG. 1A illustrates, at an abstract level, an autonomous mass-storage system, often referred to as a "disk array." The mass-storage system 102 includes two controllers 104-105 connected to two different network communications media 106 and 107, respectively, and connected to an internal communications medium 110 that connects each of the controllers 104-105 with a generally large number of mass-storage devices 112-129. Each mass-storage device, such as mass-storage device 129, in turn contains data-storage media and a mass-storage-device controller. Although many different types of mass-storage devices may be incorporated within mass-storage systems, it is currently common to include disk-drive mass-storage devices in mass-storage systems. A disk-drive, as shown in FIG. 1A, includes a controller card 132 that controls an electromechanical component 134 that positions and activates a READ-WRITE-head assembly 136 to access data stored on the surfaces of multiple magnetic disks 138-144.

Figure 1B:
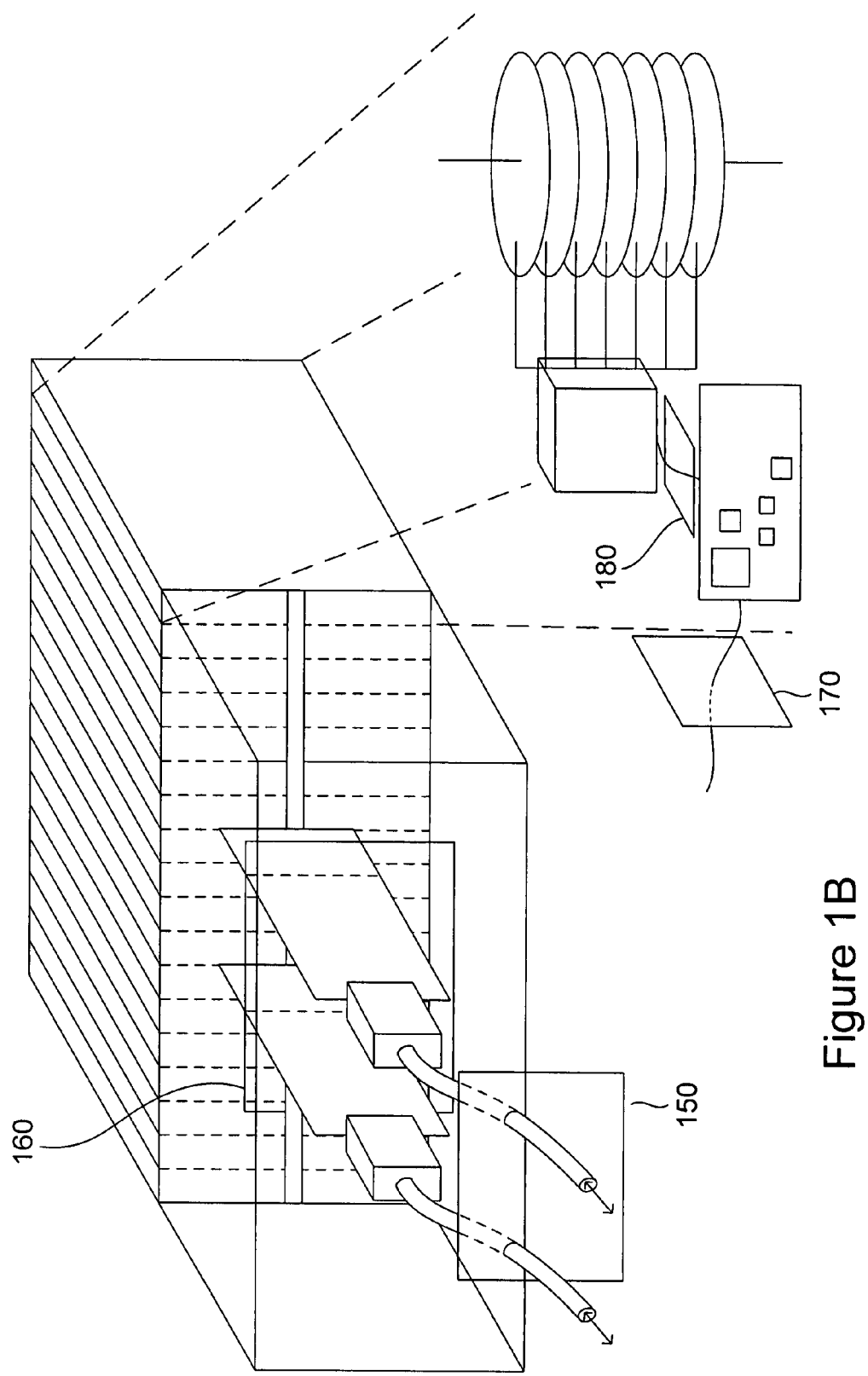
FIG. 1B illustrates, overlaid on FIG. 1A, various interfaces provided in a mass-storage system.

FIG. 1B illustrates, overlaid on FIG. 1A, various interfaces provided in a mass-storage system. The mass-storage system, as discussed above, generally provides a logical-device-based interface 150 to host computers. Host computers may create, write to, and read from one or more logical devices. Each logical device is considered, by a host computer, to be a consecutive sequence of addressable data-storage units, such as 512-byte blocks. Internally, the mass-storage-system controllers map, through a second interface 160, logical devices and block addresses within logical devices to particular sets of mass-storage devices and logical block addresses within the particular sets of mass-storage devices. Within the mass-storage device, the mass-storage-device controller maps, through a third interface 170, logical block addresses to logical block addresses with respect to individual magnetic platters, and, through a second interface, maps logical blocks with respect to particular magnetic platters to physical block addresses on the magnetic platters. The actual number of interfaces within a mass-storage system may be far greater than the four interfaces shown in FIG. 1B, and each of the interfaces may be quite complex. FIG. 1B is intended to illustrate that there are many interfaces between the logical-device interface provided to host computers and the actual, corresponding data-storage-media locations that together compose the physical storage corresponding to a logical device.

As one example of the complexities of mass-storage systems, most mass-storage systems employ one of various techniques of redundant data storage in order to increase the reliability and fault-tolerance of the mass-storage system. In one redundant-data-storage scheme, the mass-storage system mirrors mass-storage devices, so that each data block within a logical device is stored twice, on two different mass-storage devices, within the mass-storage system. A second redundant-data-storage scheme is referred to as "erasure coding" redundancy. Erasure coding redundancy is somewhat more complicated than mirror scheme. Erasure coding redundancy often employ Reed-Solomon encoding techniques used for error control coding of communications messages and other digital data transferred through noisy channels. These error-control-coding techniques are specific examples of binary linear codes. Data blocks are striped across multiple mass-storage devices along with additional blocks containing parity, or checksum, data. Depending on the specific error-control-coding technique and the amount of parity data stored for each block of data, failure of one, two, or more mass-storage devices in the set of mass-storage devices across which data blocks are striped can be accommodated without data loss, since the surviving mass-storage devices contain sufficient data and parity information to completely recover those data and parity blocks lost due to failure of the one, two, or more mass-storage devices. The second redundant-data-storage scheme is somewhat more complex than mirroring, but is much more efficient with respect to the amount of data that needs to be stored redundantly in order to recover from particular mass-storage-device-failure scenarios.

Figure 2:
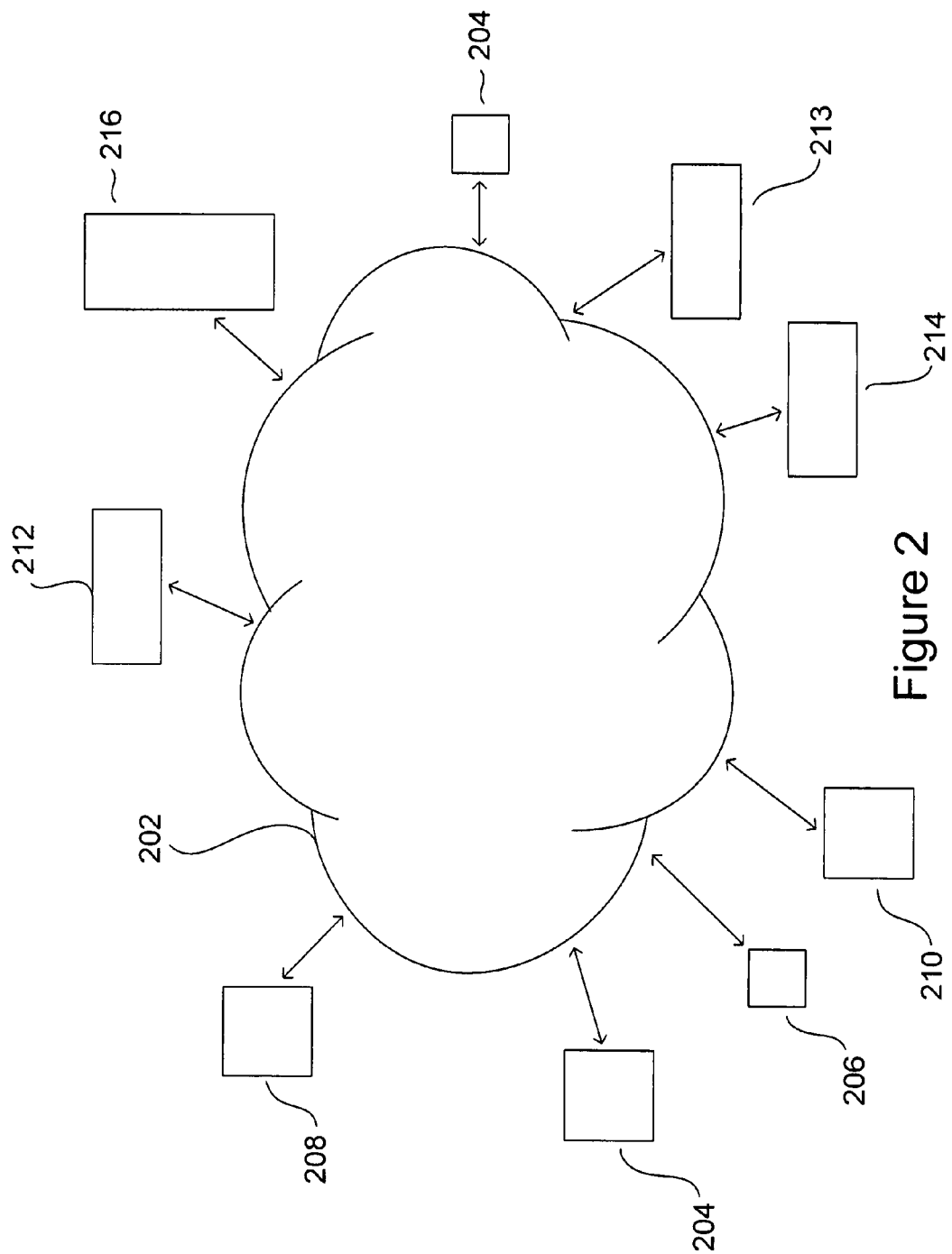
FIG. 2 shows a modern networked computer environment.

FIG. 2 shows a modern networked computer environment. In a modern networked computer environment, hundreds, thousands, or tens of thousands of different computational entities may communicate with one another through one or more networks 202. The systems may include personal computers and work stations 204 and 206, higher-end computer systems 208-210, mass-storage systems 212-214, and a mass-storage-system aggregator/server 216 that provides a higher-level data-storage interface to various host computers, while using two or more mass-storage systems for storing the data. For example, the mass-storage-system-aggregator/server 216 may provide a data-storage interface to the various host computers 204, 206, and 208-210, and by storing data on, and retrieving data from, the three mass-storage systems 212-214. In other words, the host computers exchange data and data-access commands with the mass-storage-device aggregator/service 216, which, in turn, maps the data and data-storage requests to one or more of the mass-storage systems 212-214. However, certain mass-storage systems may be accessed directly by host computers, and host computers may access remote data stored on remote host computers. Thus, there are a wide range of different types of data-storage interfaces and data-storage-system configurations available within modern networked computer environments.

A common high-level data-storage interface that can be provided by both individual mass-storage systems and by mass-storage-system aggregators/servers is next described. This data-storage interface is but one example of many possible general data-storage interfaces that can be provided by mass-storage systems. Rather than attempt to discuss the present invention with respect to all possible data-storage interfaces, the present invention is described, below, with respect to the general data-storage interface now discussed with reference to FIGS. 3-6.

Figure 3:
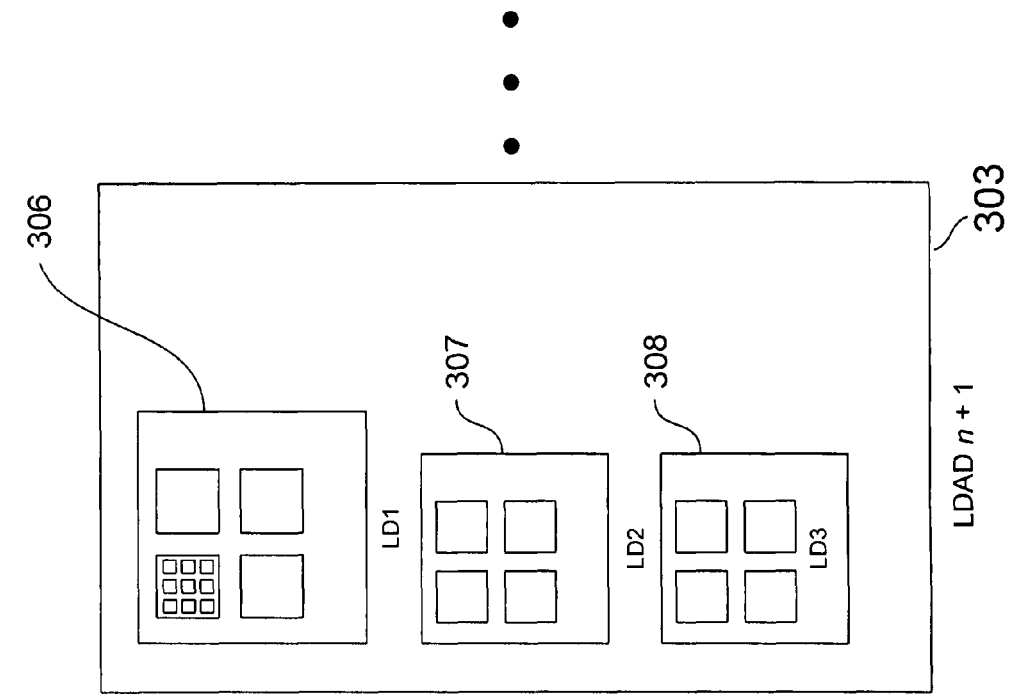
FIG. 3 illustrates the hierarchical levels of data-storage objects provided by the general data-storage interface that is used to describe embodiments of the present invention.
Figure 3:
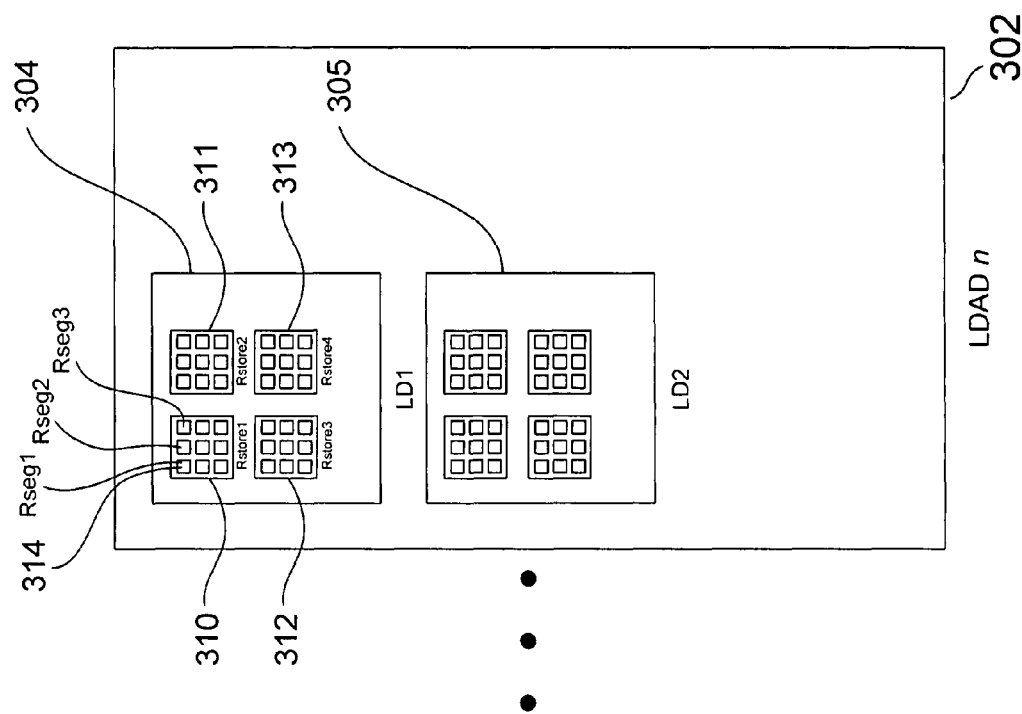

FIG. 3 illustrates the hierarchical levels of data-storage objects provided by the general data-storage interface that is used to describe embodiments of the present invention. The data-storage interface provides, at the highest level, a number of logical-device-allocation domains ("LDADs") 302-303. Each LDAD contains a number of logical devices. In FIG. 3, LDAD 302 is shown to contain two logical devices 304-305 and LDAD 303 is shown to contain three logical devices 306-308. In actual mass-storage systems, an LDAD may contain hundreds, thousands, tens of thousands, or more logical devices. Each logical device is, in turn, composed of one or more Rstore objects. In FIG. 3, each logical device is shown to contain four Rstore objects, such as Rstore objects 310-313 within logical device 304. An actual logical device may contain an arbitrary number of Rstore objects, up to some large maximum limit. Each Rstore object is, in turn, composed of a number of Rseg objects. For example, Rstore object 310 is shown, in FIG. 3, to contain nine Rseg objects, including a first Rseg object 314, although the actual number or Rseg objects in an Rstore object may be smaller or much larger.

The LDADs shown in FIG. 3 may, in many cases, map to individual mass-storage systems. Thus, a mass-storage-system aggregator/server may provide the general data-storage interface shown in FIG. 3 to host computers, and may map each LDAD provided to host computers to a different mass-storage system. However, a mass-storage system may also choose to provide a general data-storage interface that includes two or more LDADs, and a mass-storage-system aggregator/server may map a given LDAD to multiple mass-storage systems or may map two or more LDADs to a single mass-storage system. Logical devices are consecutive sequences of addressable data-storage units. In the general data-storage interface shown in FIG. 3, an Rstore object is data-storage space allocated on a number of mass-storage devices within a mass-storage system according to a redundant-data-storage scheme, such as mirroring or an erasure-coding-based redundant-data-storage scheme. For example, an Rstore may be several gigabytes of data striped across a number of mass-storage devices, along with parity information. The Rseg objects are smaller-granularity partitions of the Rstore space. For example, each Rseg may contain one megabyte of data-storage space. The Rstore and Rseg data objects conveniently abstract the contents of a logical device from the particular redundant-data-storage-based scheme used for storing the data contained in the logical device. The particular sizes of the Rstore and Rseg data objects are not relevant to discussion of the present invention. The particular redundant-data-storage-based data-storage schemes that are used for storing data are also not relevant.

Figure 4:
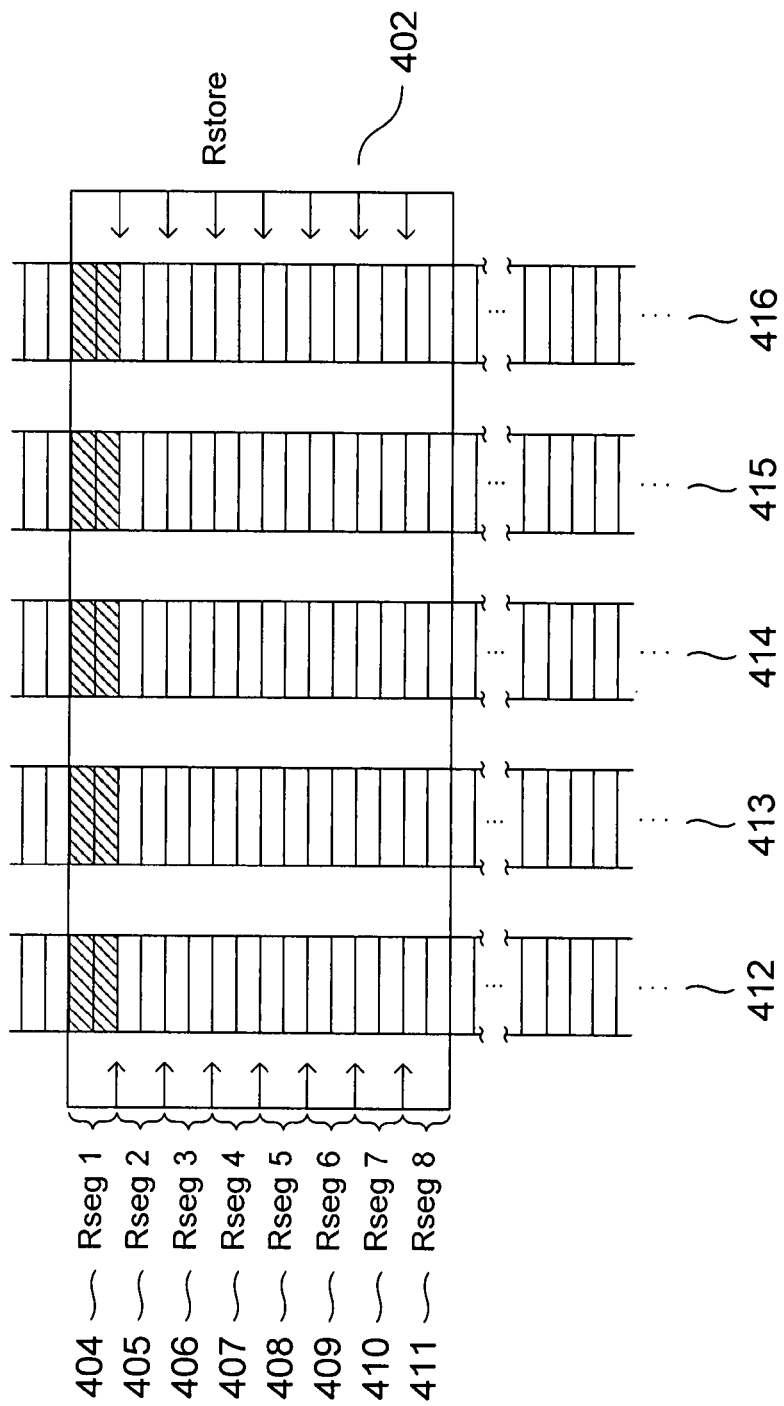
FIG. 4 illustrates a mapping of Rstore and Rseg data objects to physical storage.

FIG. 4 illustrates a mapping of Rstore and Rseg data objects to physical storage. As discussed above, an Rstore data object 402 is composed of multiple Rseg data objects 404-411. When erasure-coding-based redundant-data-storage schemes are employed, an Rstore data object may be mapped across a number of mass-storage devices 412-416. In the redundant-data-storage-based data-storage scheme shown in FIG. 4, for any particular Rseg, four of the mass-storage devices contain the data, while one mass-storage device 413 contains parity information. In general, the mass-storage device or devices containing parity vary from one Rstore to another. Each Rseg, such as Rseg 404, is striped across the physical disks to which the Rstore containing the Rseg is mapped, with each Rseg being a kind of horizontal subsection of the entire Rstore, as illustrated in FIG. 4. Thus, in FIG. 4, Rseg 1 (404) is mapped to the shaded portion of the physical-disk storage space. Although FIG. 4 illustrates one possible mapping between Rstore and Rseg objects and mass-storage devices, many other mappings are possible.

Figure 5:
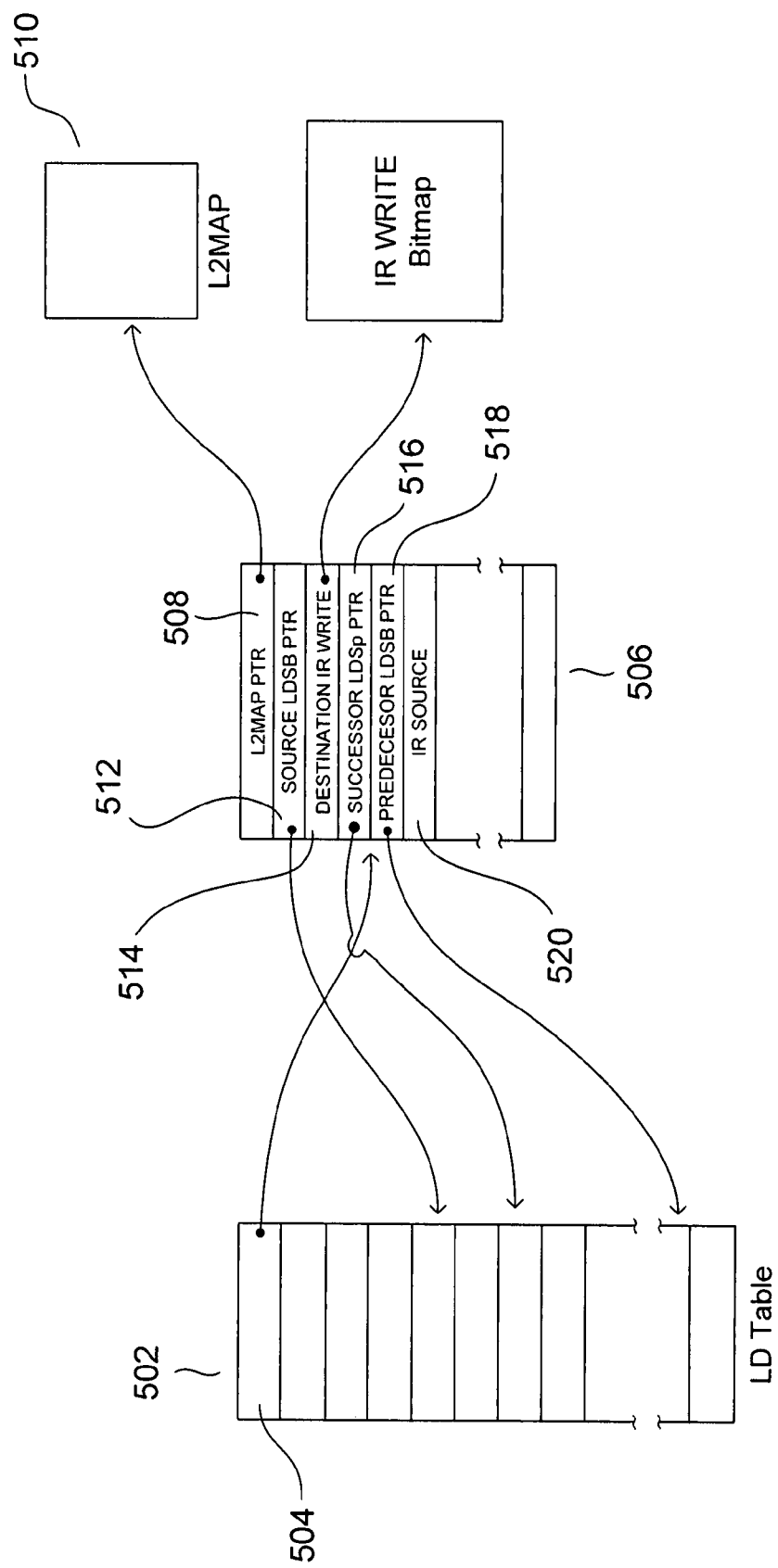
FIG. 5 illustrates a logical-device table associated with each LDAD for representing the logical devices within an LDAD.

Various data structures are employed within a mass-storage system or mass-storage aggregator/server, both subsequently referred to as "mass-storage systems," for managing the data-storage objects within a mass-storage system. One possible set of data structures is next described. FIG. 5 illustrates a logical-device table associated with each LDAD for representing the logical devices within an LDAD. The logical device table 502 includes a number of entries, each entry corresponding to a different logical device. Each entry of the logical device table contains, or references, a data structure that includes a number of different fields that describe the logical device represented by the entry. In FIG. 5, the first entry of the logical device table 504 is shown to reference a data structure 506 containing a number of different fields that describe the logical device represented by the first entry of the logical device table. One field 508 references an L2MAP 510 which contains detailed information about the contents of the logical device. The data structure 506 also contains source and destination pointers 512 and 514 that point back into the logical device table 502 to indicate the source and destination for restore operations. The data structure further includes a successor pointer 516 and a predecessor pointer 518 that also refer to entries in the logical device table, as well as an ir_source pointer used during restore operations 520. The successor and predecessor references allow logical devices to be linked together into snapshot trees. Use of the successor and predecessor references 516 and 518 is described further, below. The data structure 506 may contain many additional fields that describe various aspects of, or current operations performed on, logical devices.

Figure 6:
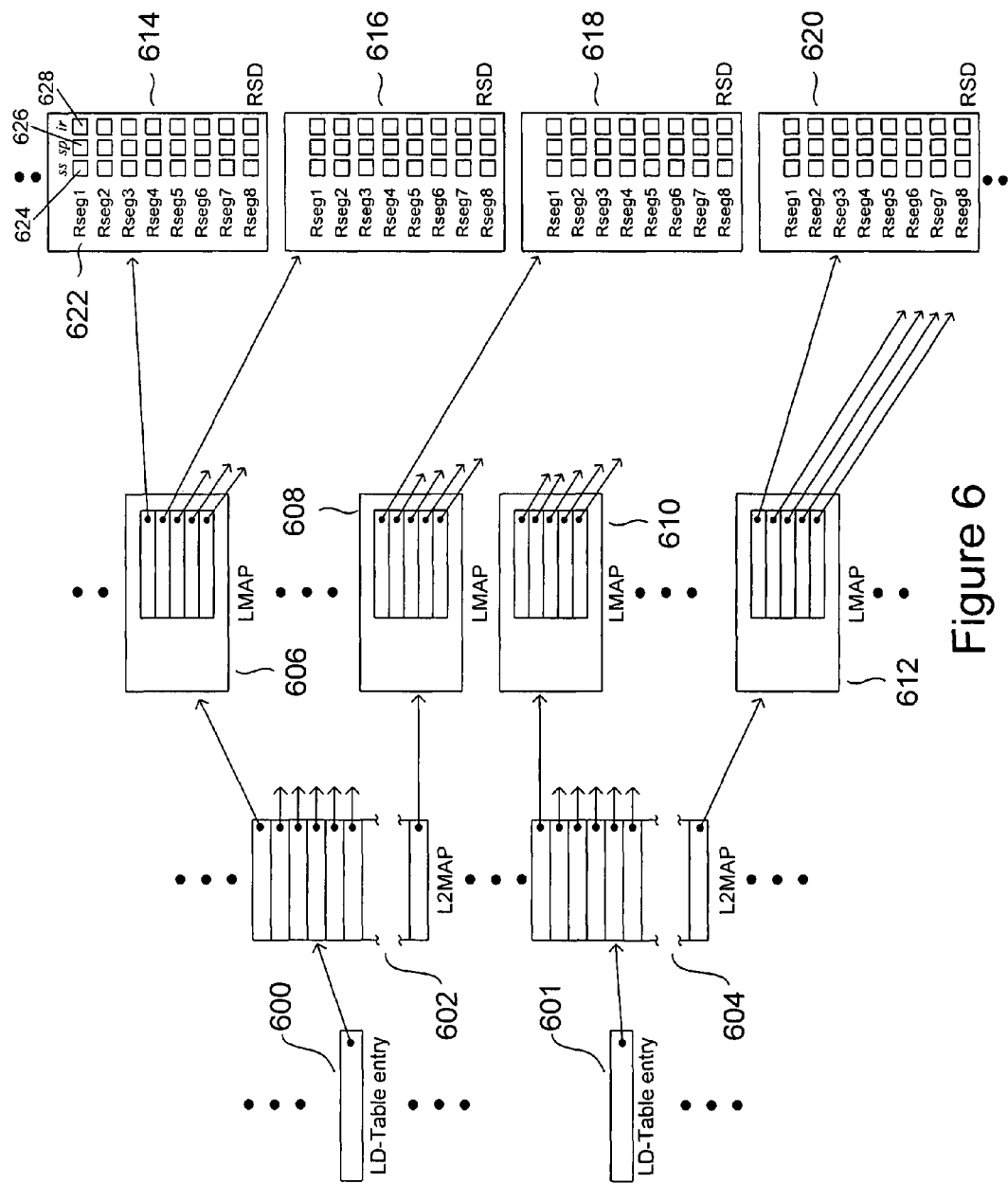
FIG. 6 illustrates additional data structures used to represent the mapping of logical disk addresses of logical disks to logical disk addresses of physical disks as well as to store state information about the data contents of a logical device.

FIG. 6 illustrates additional data structures used to represent the mapping of logical disk addresses of logical disks to logical disk addresses of physical disks as well as to store state information about the data contents of a logical device. As discussed with reference to FIG. 5, each logical device is represented by an entry in the logical device table that contains, or references a data structure containing, an additional reference to an L2MAP. Thus, as shown in FIG. 6, each of two logical devices represented by logical-device-table entries 600 and 601 are each associated with a single L2MAP, 602 and 604 respectively. Entries in the L2MAP reference LMAPs. Thus, as shown in FIG. 6, a first logical device is represented by L2MAP 602 which, in turn, references LMAPs including LMAPs 606 and 608, and a second logical device is represented by L2MAP 604 which, in turn, references LMAPs including LMAPs 610 and 612. Each entry in an LMAP describes an Rstore, and additionally references an RSD data structure that represents the Rstore in which Rseg objects are contained. In FIG. 6, the each LMAP entry in LMAPs 606, 608, 610, and 612, and in other LMAPs referenced from L2Maps 602 and 604, but not shown in FIG. 6, references an RSD data structure, including RSD data structures 614, 616, 618, and 620. In certain implementations, LMAP and RSD data structures are only allocated as needed to describe physical data-storage space allocated by the mass-storage system for the logical device corresponding to the L2MAP, while in other implementations, LMAPs and RSDs are allocated for every L2MAP entry. Thus, in the first implementation, L2MAPs are sparsely-populated, so that memory and mass-storage space is not wasted for describing physical data-storage space that may not been allocated for a logical device. In either implementation, physical storage space is allocated on an as-needed basis.

Each RSD data structure contains metadata describing the Rstore which the RSD represents, a representation of the physical segments onto which the Rstore is mapped 6, and information about each of the Rsegs contained within the Rstore. For purposes of describing the present invention, each Rseg is described, in part, in the RSD by three single-bit fields. For example, as shown in FIG. 6, the first Rseg 622 described in RSD 614 is described, in part, by: (1) an ss bit 624 that indicate whether the Rseg depends on data stored in a corresponding Rseg of a successor logical device; (2) an sp bit 626 that indicates whether or not the Rseg depends on data stored in a corresponding Rseg of a predecessor logical device; and (3) an ir bit 628 used during restore operations. The use of the ss and sp bits is described, in greater detail, below, as is the use of the ir bit and ir_source field during instant snap tree copy operations. Again, it should be noted that many different possible data structures can be used to represent logical devices within a mass-storage system. The data structures discussed with reference to FIGS. 5-6 provide a convenient foundation, or exemplary data-structure scheme, for discussion of embodiments of the present invention, below. However, the present invention may be practiced on, or applied to, many different data-structure representations of LDADs and logical devices within many different types of mass-storage systems. Even for the described data structures, many different implementations and layouts are possible, and the present invention may be practiced on, or applied to, any of the many possible implementations and layouts.

Snapshot Operation

Next, a snapshot operation is described with reference to FIGS. 7A-E. FIGS. 7A-E use similar illustration conventions, described below with respect to FIG. 7A.

Figure 7A:
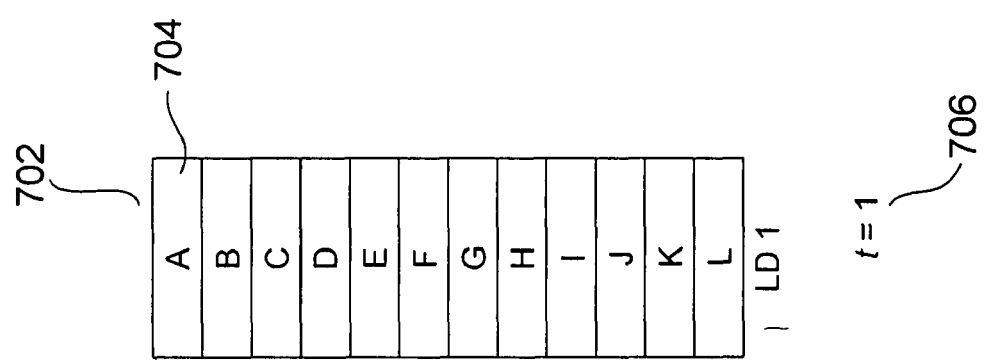

FIG. 7A shows a simplified representation of a logical device. The logical device 702 comprises 12 Rsegs, including a first Rseg 704 with contents represented by the letter "A." As discussed above, an Rseg may contain thousands or million of bytes, but, for purposes of describing the present invention, it is sufficient to describe the contents of an Rseg by a single letter. The letter "A" in the first Rseg 704 can be thought of as representing the current data state of the Rseg, where the data state constitutes the contents of thousands or millions of bytes or other units of data storage contained within the Rseg. As discussed above, a logical device may contain anywhere from one to thousands, millions, or more of Rsegs, with the size of a logical device limited only by storage capacity of individual mass-storage systems and by any other constraints imposed on the absolute maximum size of logical devices by the general data-storage interface. The representation of the logical device 702 shows the data states of the Rsegs within the logical device at a particular point in time. The text "t=1" 706 in FIG. 7A indicates that the data state of the logical device shown in FIG. 7A is the data state at a particular point in time t=1. Logical devices are generally active, constantly changing logical entities. At any point in time, there may be many READ and WRITE operations pending for application to the logical device. Thus, the state of a logical device at a particular instant in time may differ dramatically from the state of the logical device at a previous point in time or the state of the logical device at a future point in time.

Figure 7B:
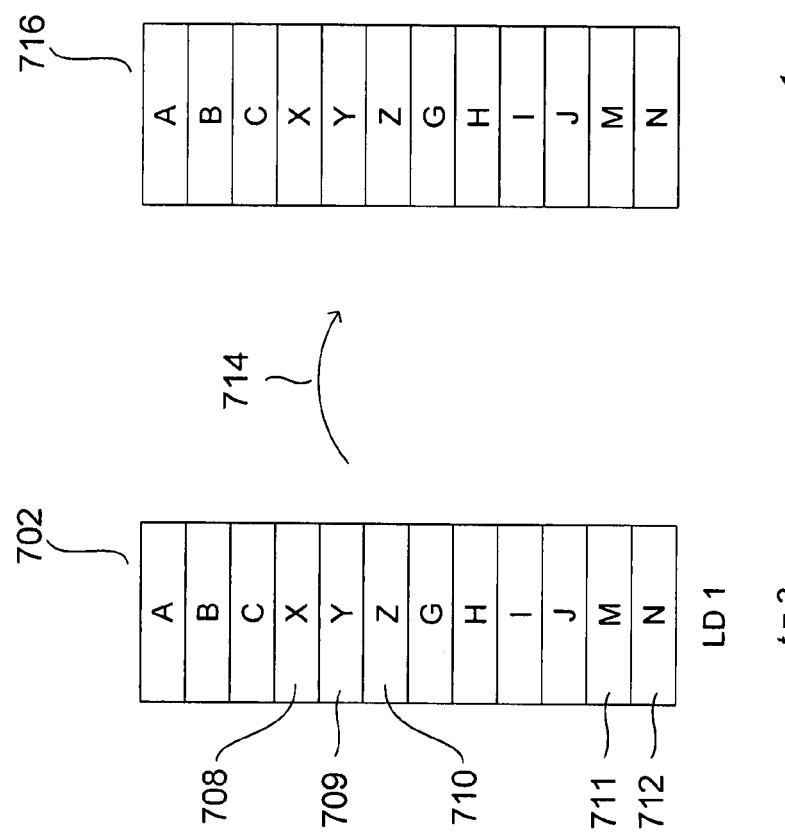

FIG. 7B illustrates a logical snapshot operation. In FIG. 7B, the logical device 702 is shown at a point in time t=2. Note that, since the time t=1, the data states of Rsegs 708-712 have changed. A host computer may decide, at time t=2, that a snapshot of the current data state of the logical device should be taken. The snapshot operation 714 can be thought of as a logical copy of the contents of the logical device to create a snapshot copy 716.

Figure 7C:
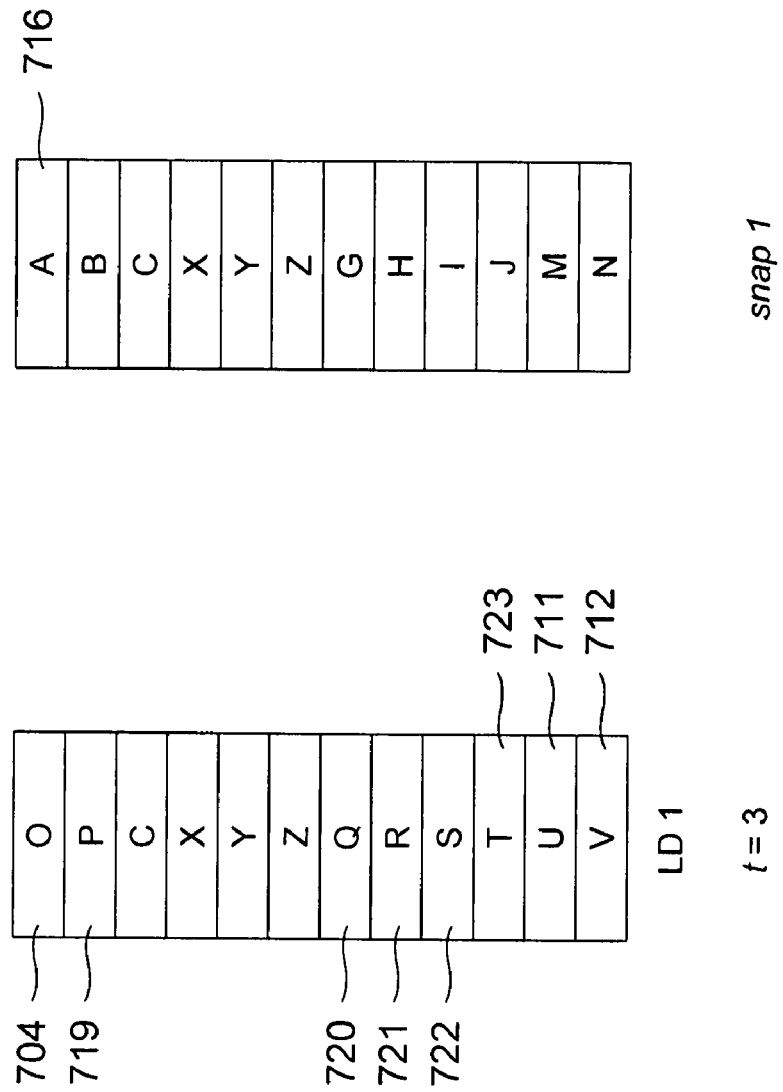

FIG. 7C shows the logical device and snapshot copy at a future point in time. As shown in FIG. 7C, at time t=3, additional Rsegs of the logical device 704, 719-723, and 711-712 have been altered since the previous point in time t=2 shown in FIG. 7B. However, in this example, the snapshot 716 has not been altered.

Figure 7D:
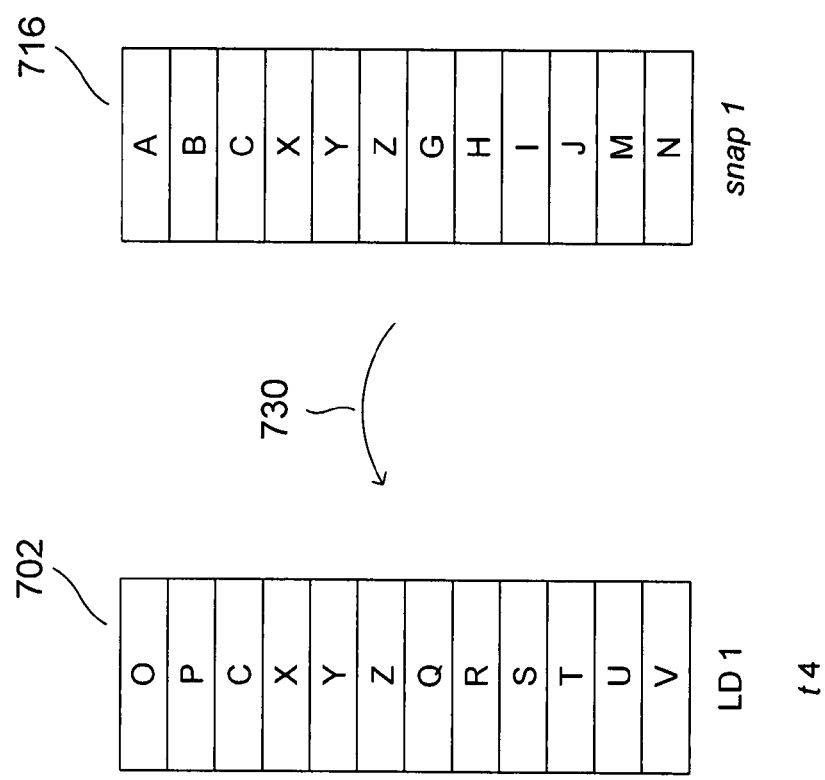

FIG. 7D illustrates a restore operation. If, at a time t=4, a host computer desires to restore the logical device to the data state that the logical device had at time t=2, when the snapshot was created, then the host computer can direct a restore operation 730 to the logical device and snapshot to copy the contents of the snapshot 716 back into the logical device 702.

FIG. 7E shows a series of snapshots taken for a logical device at three different instances in time. As shown in FIG. 7E, the logical device 740 is associated with three snapshots 742-744. Snapshot 742 was taken at time t=1, snapshot 743 was taken at time t=2, and snapshot 744 was taken at time t=3. The sequence of snapshots reflects the changes made to the logical device over time. A host computer may choose to restore the logical device to a previous data state of the logical device at any of the times corresponding to the times of the snapshots by issuing an appropriate RESTORE command.

Snapshot operations are quite useful for data-management applications. For example, a relational database management system ("RDMS") may frequently, at a fixed interval in time, or following fixed amounts of accesses or activity, take snapshots of one or more logical devices within which the RDMS stores tables, views, and other data. Should, for some reason, one or more of the logical devices become corrupted, due to problems at the RDMS level, the RDMS can restore the logical devices to successively more distant points in time from the current time until a version of the logical devices is obtained in which there is no data corruption. The RDMS can then use separate log files stored within separate logical devices to re-execute intervening transactions in order to bring the state of the RDMS up to a most recent state prior to detection of the data corruption. Snapshot operations also find use in data archiving and other applications.

FIGS. 8A-G illustrate how snapshot operations are carried out within a mass-storage system that employs the general data-storage interface shown in FIGS. 3-4 and the internal data structures shown in FIGS. 5-6. Again, the following discussion is a specific example of a more general concept. Snapshot operations can be carried out in a variety of different ways in different types of mass-storage systems employing a variety of different data-storage interfaces and internal data structures.

Figure 8A:
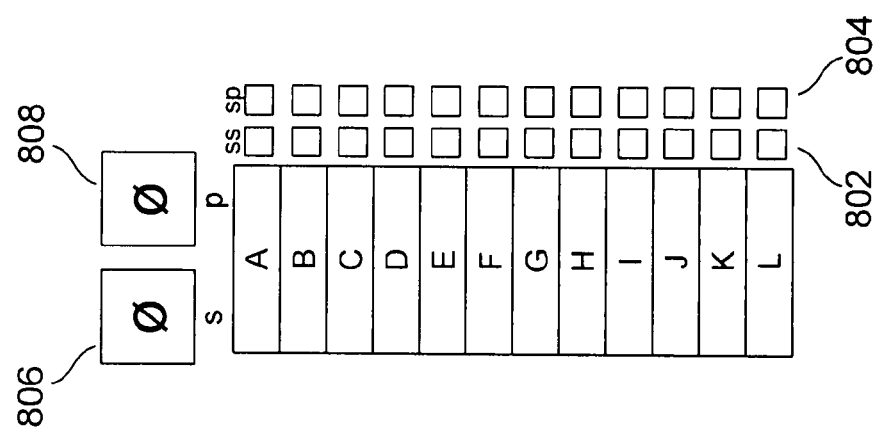
FIGS. 8A-G illustrate how snapshot operations are carried out within a mass-storage system that employs the general data-storage interface shown in FIGS. 3-4 and the internal data structures shown in FIGS. 5-6.

FIG. 8A illustrates the contents of a logical device, using illustration conventions similar to those used in FIG. 7A. However, in FIG. 8A, additional data-structure detail is shown. The ss and sp bits associated with each Rseg are shown to the right of the Rseg, in two columns 802 and 804, and the successor 806 and predecessor 808 fields of the logical-device table entry for the logical device are shown above the contents of the logical device.

Figure 8B:
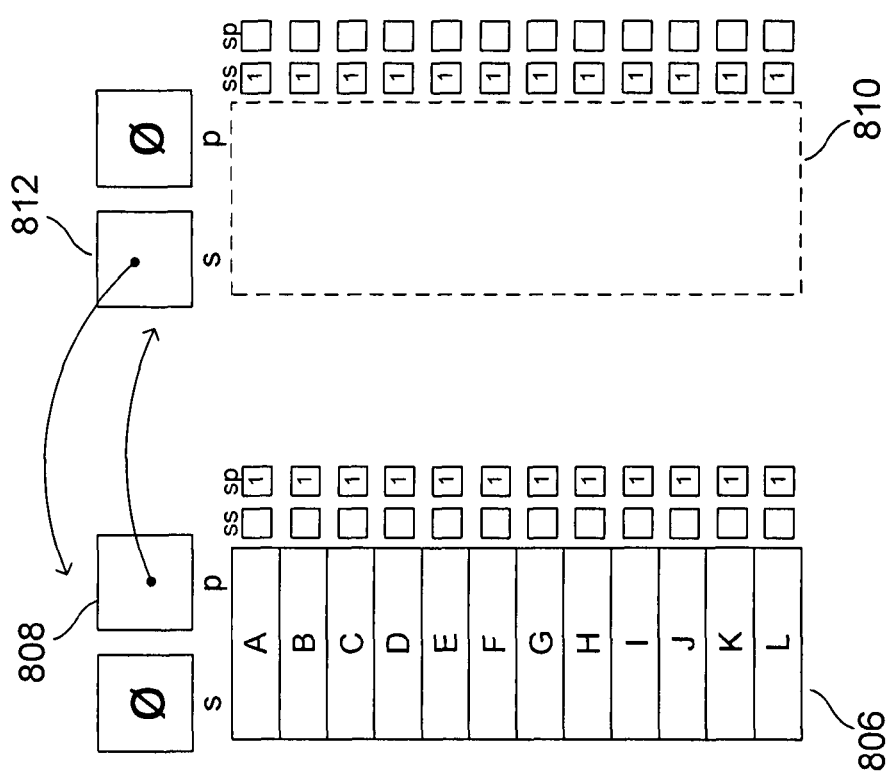

FIG. 8B illustrates a first snapshot operation directed to the logical device. In this snapshot operation, a data structure representing the snapshot logical device 810 is constructed. However, no data is actually copied, initially, into the snapshot logical device 810 from the original, or source, logical device 800. Instead, the ss bits of the Rsegs of the snapshot logical device 810 are set to "1," indicating that the snapshot logical device 810 shares the corresponding Rseg with a successor logical device, in this case the original, or source, logical device 800. Similarly, the sp bits of the original logical device 800 are set to "1" to indicate that each of the Rsegs of the original logical device now shares data with a predecessor logical device. Note also that the source logical device 800 and the snapshot logical device 810 are now linked together in a doubly linked list through the successor and predecessor pointers 808 and 812. Thus, initially, the snapshot logical device 810 is essentially a shell, or placeholder, in time.

Figure 8C:
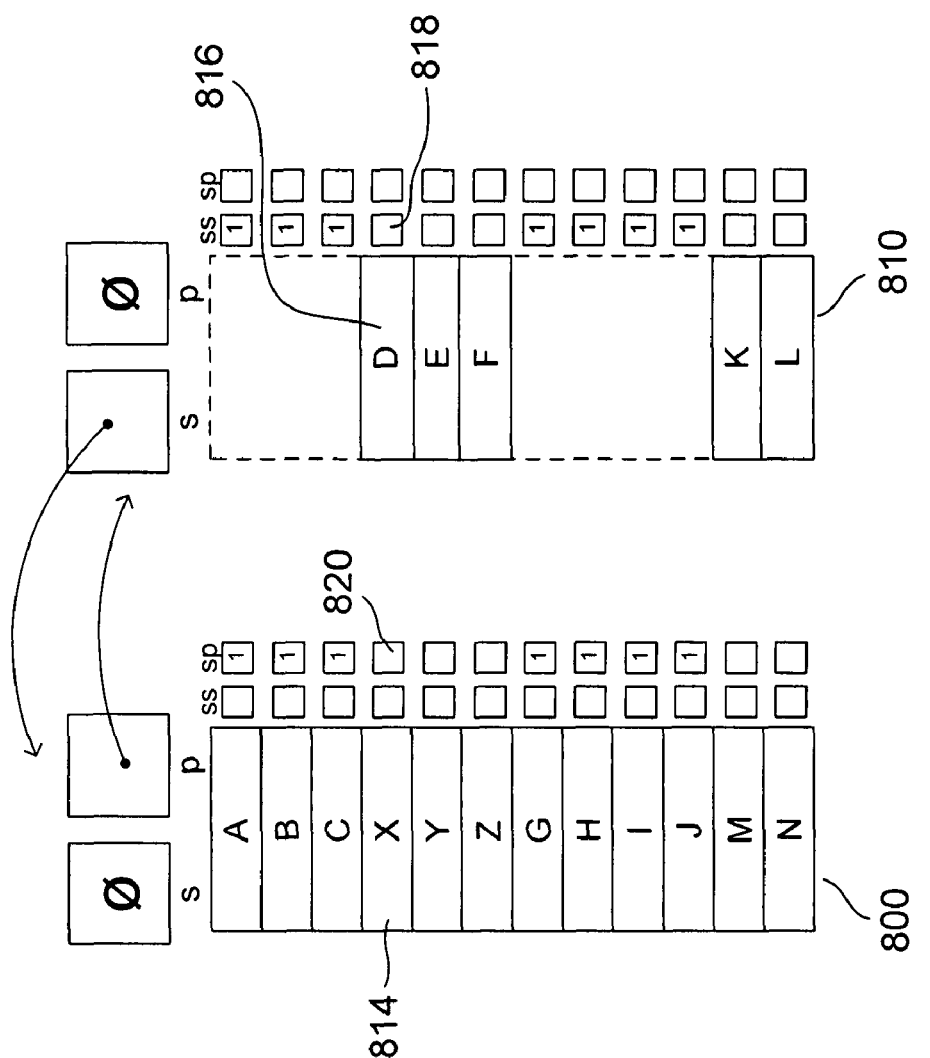

FIG. 8C shows the logical device and snapshot logical device of FIG. 8B following a number of WRITE operations directed to the original logical device. As shown in FIG. 8C, for each Rseg written in the source logical device following the snapshot operation, a corresponding Rseg is instantiated within the copy logical device to contain the original contents of the corresponding source-logical-device Rseg prior to the WRITE operation. For example, Rseg 814 of the source logical device 800 has been written, since the snapshot operation, to now contain the data state represented by the letter "X." In the course of performing the WRITE operation, the original contents of Rseg 814 are first copied into a newly allocated Rseg 816 in the snapshot logical device 810. This copy operation only occurs when an Rseg of the source logical device is first altered from the state that it had at the time of the most previous snapshot operation. Were Rseg 814 to again be overwritten, Rseg 816 in snapshot logical device 810 would not be changed. Note also that the ss bit 818 associated with Rseg 816 has been cleared and the sp bit 820 associated with Rseg 814 has also been cleared. Rseg 816 no longer shares data with a successor logical device, and Rseg 814 no longer shares data with a predecessor logical device. The ss and sp bit can be thought of as representing dependency chains among Rsegs of logical devices within a snapshot tree.

Figure 8D:
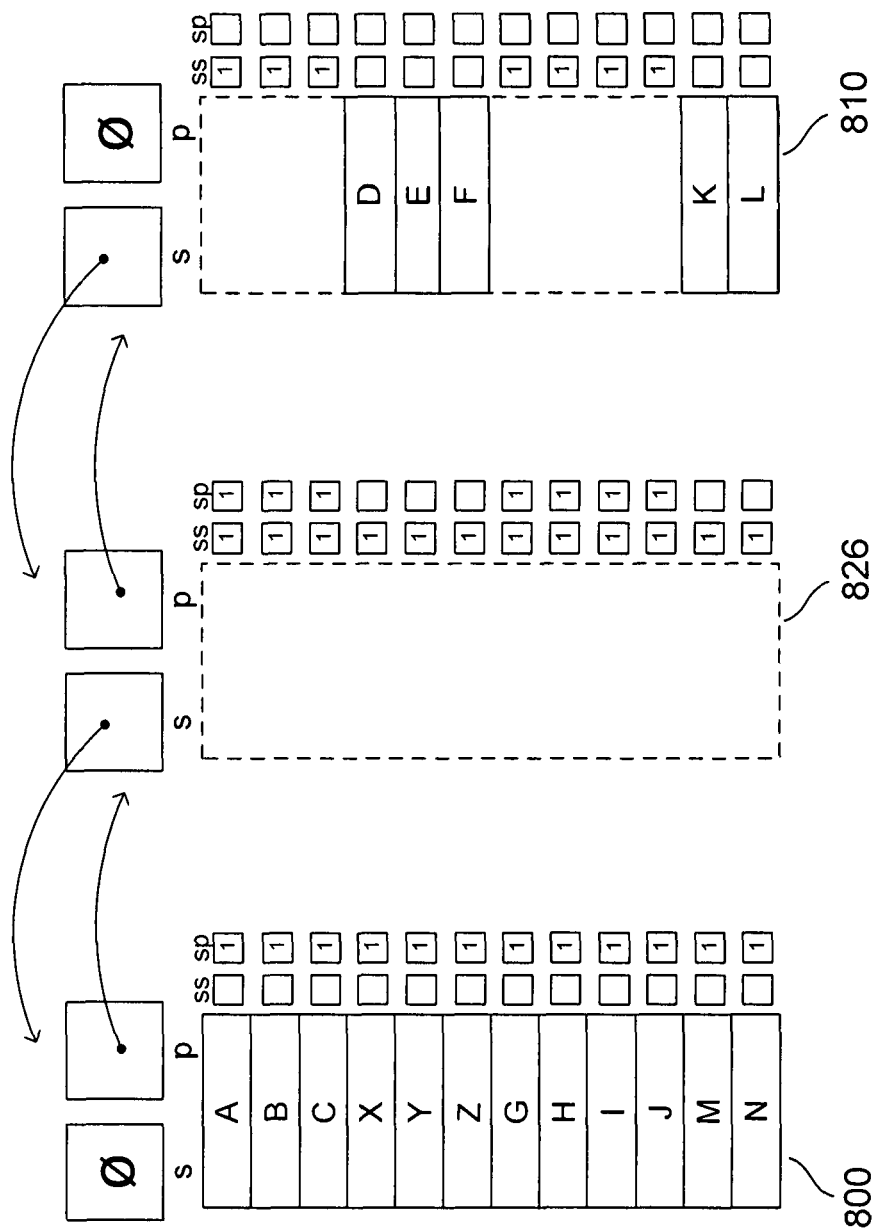

FIG. 8D shows a second snapshot operation directed to the logical device of FIG. 8A. The first snapshot logical device 810 remains at the end of the doubly linked list, and the new snapshot logical device 826 is inserted into the doubly linked list between the source logical device 800 and the first snapshot logical device 810. The second snapshot logical device is essentially a data-structure framework, and initially contains no data, just as the first snapshot logical copy 810 in FIG. 8B initially contained no data. All of the sp bits of the source logical device are copied to the sp bits of the second snapshot logical device 826, and the sp bits of the source logical device are then all set to "1." All of the ss bits of the second snapshot logical device 826 are also set to "1." Thus, initially, the second snapshot logical device shares all of its data with its successor, the source logical device. The ss and sp bits associated with the first logical device 810 are not altered.

Figure 8E:
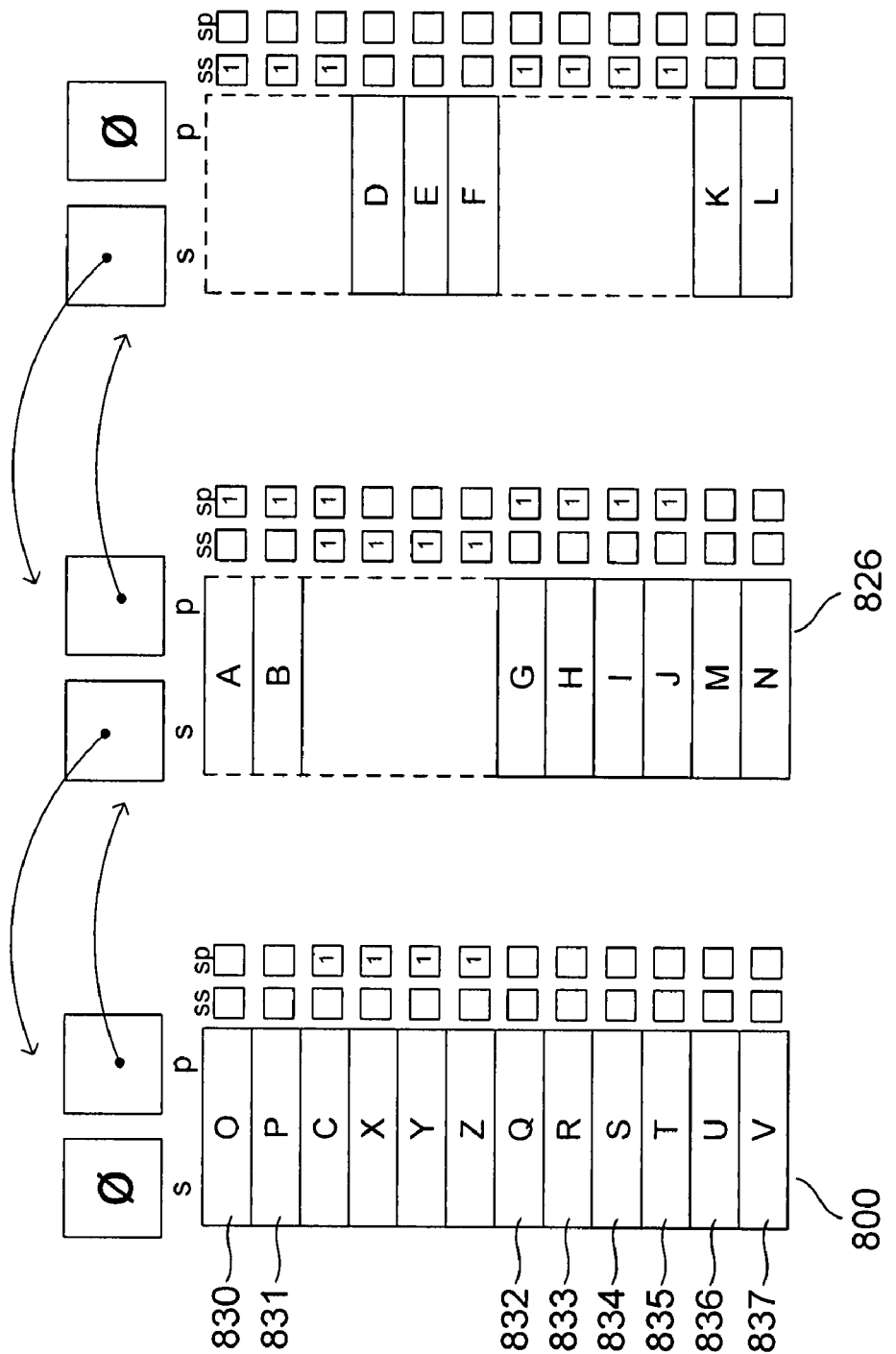
Figure 8F:
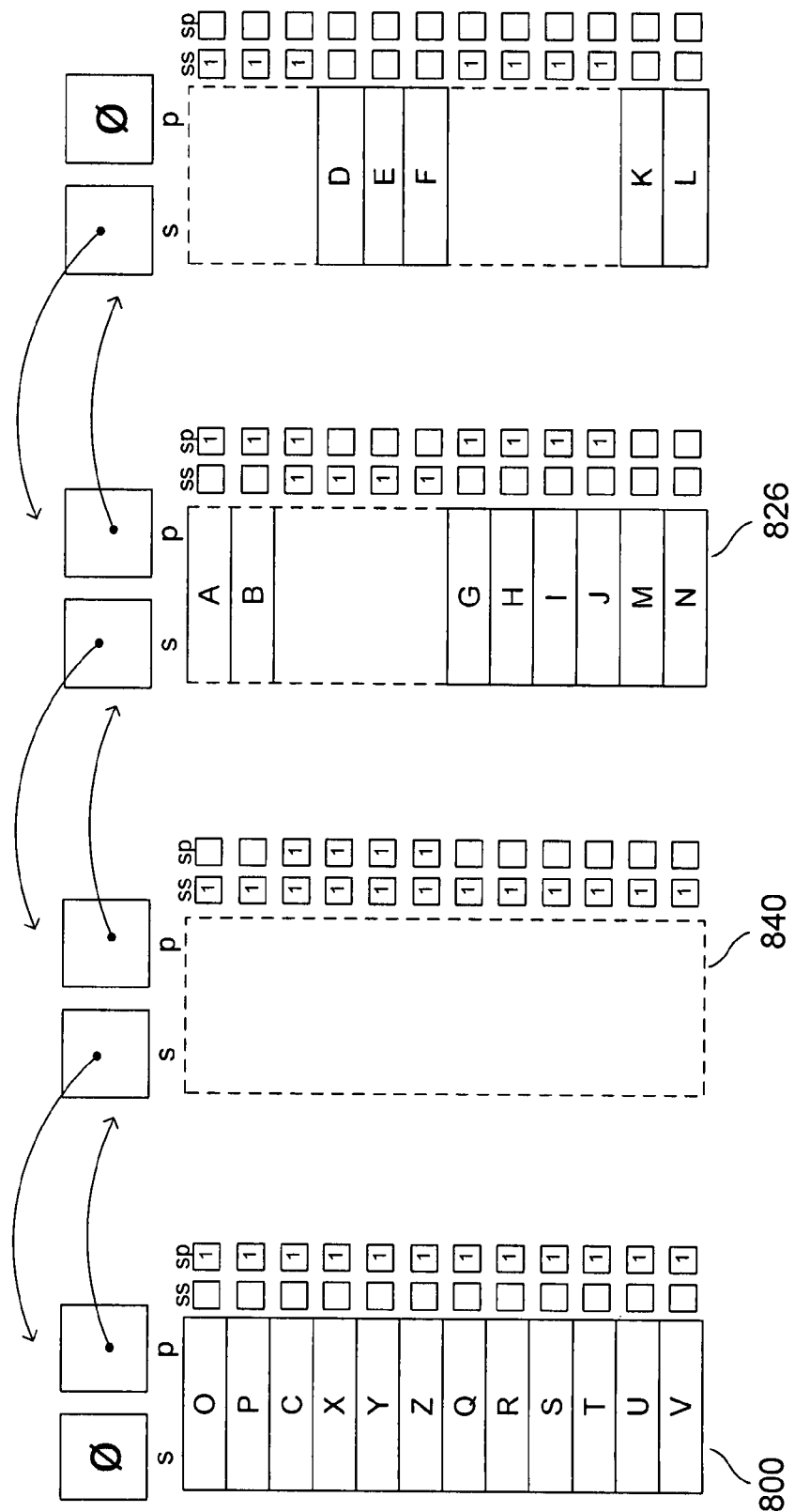
Figure 8G:
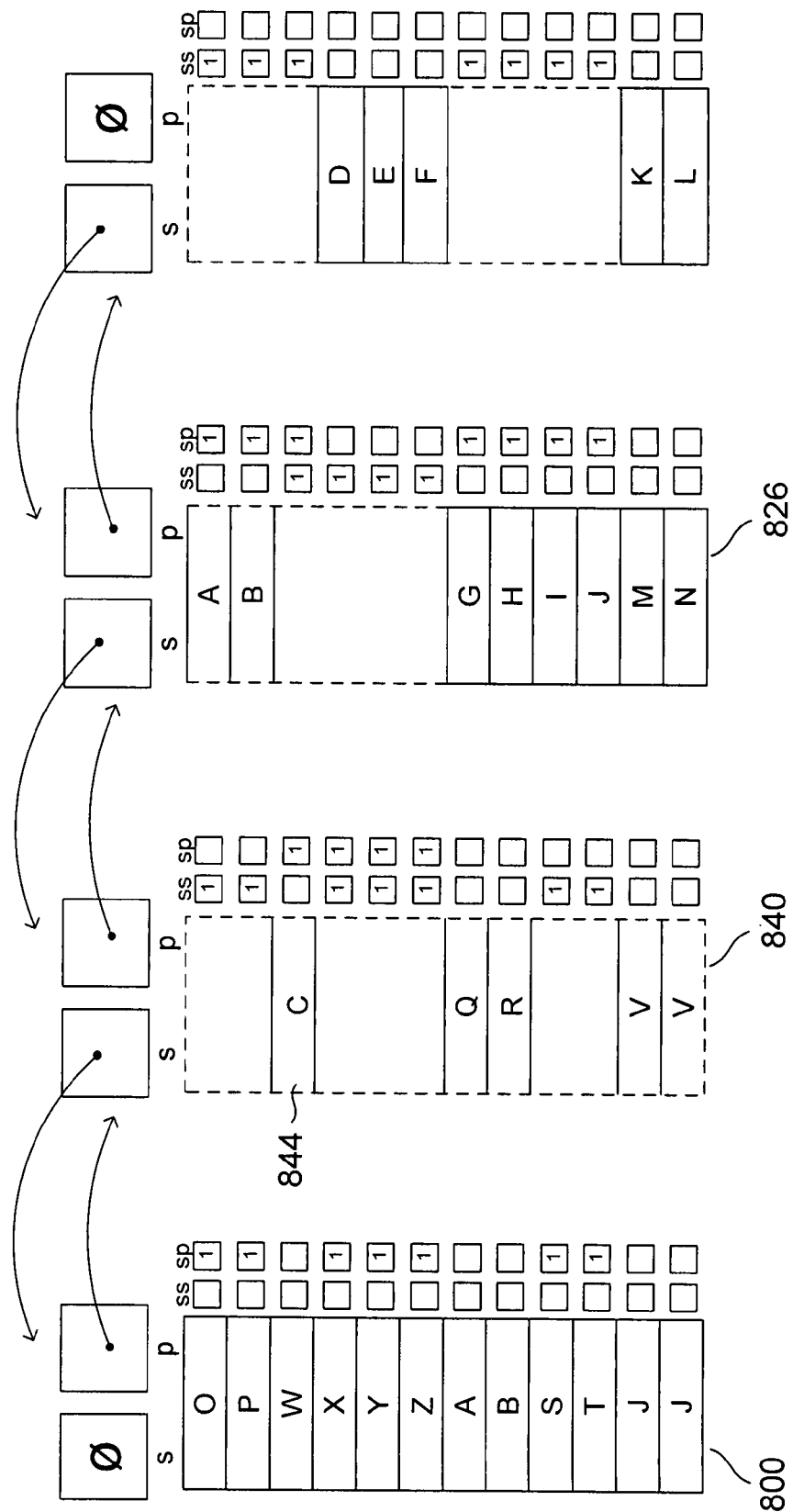

FIG. 8E illustrates the state of the source logical device, first snapshot logical device, and second snapshot logical device following additional WRITE operations directed to the source logical device. As shown in FIG. 8E, the contents of Rsegs 830-831 and 832-837 of the source logical device 800 have all been altered since the second snapshot operation, and therefore the original contents of these altered Rsegs have been copied to newly allocated Rsegs in the second snapshot logical device 826. Note that the ss bits associated with the newly allocated Rsegs in the second snapshot logical device 826 have been cleared, as have the corresponding sp bits for corresponding Rsegs in the source logical device 800. FIG. 8F illustrates a third snapshot operation. The third snapshot operation introduces a third snapshot logical device 840 between the source snapshot logical device and the second snapshot logical device 826. Again, initially, the new snapshot logical device 840 is essentially a data-structure framework, and does not contain data. FIG. 8G illustrates the source logical device and three snapshot logical devices of FIG. 8F following additional data changes made to the source logical device. Again, for those Rsegs of the original logical device 800 altered since the snapshot operation shown in FIG. 8F, corresponding Rsegs in the third snapshot logical device 840 are allocated and written with the contents of the Rsegs of the source logical device prior to their alternation.

The snapshot operation illustrated in FIG. 8A-G is space efficient. Rsegs are allocated and filled with data in snapshot logical devices only when necessary. Thus, the snapshot logical devices 810, 826, and 840 are sparse, and essentially contain data-state differences that occur in the source logical device from the time that the snapshot logical device is created until the time that a successor snapshot logical device is created. It should be noted that snapshot logical devices can be separately accessed in both READ and WRITE operations. For example, snapshot logical device 840 can be accessed to write the contents of Rseg 844. If the contents of Rseg 844 are altered by a WRITE operation, then the current contents of Rseg 844 are first copied into a newly allocated Rseg corresponding to Rseg 844 in snapshot logical device 826, since snapshot logical device 826 depends on snapshot logical device 840 with respect to that Rseg. Only when the contents of Rseg 844 have been copied to snapshot logical device 826 can the contents of Rseg 844 be modified, in order to maintain logical consistency within the snapshot tree comprising source logical device 800 and snapshot logical devices 840, 826, and 810.

Were a RESTIORE command to be directed to the source logical device 800 to retired the source logical device to the data state at the point in time represented by the first snapshot logical device 810, data from all three snapshot logical devices would be needed. For example, data for the first two Rsegs, "A" and "B," is found, by following ss-bit-encoded dependency chains, in the second snapshot logical device 826, while data for the third Rseg, "C," is found, by following an ss-bit-encoded dependency chain, in the third snapshot logical device 840. By contrast, data for the fourth, fifth, and sixth Rsegs, "D," "E," and "F," is found in the first snapshot logical device. In other words, to restore the source logical device to a previous data state, the restore operation starts with a snapshot logical device corresponding to that data state, and locates the data for each Rseg either in that snapshot logical device, when it is present, or in successor logical devices when data is not present in the snapshot logical device corresponding to the data state to be restored.

Embodiments of the Present Invention

Figure 9:
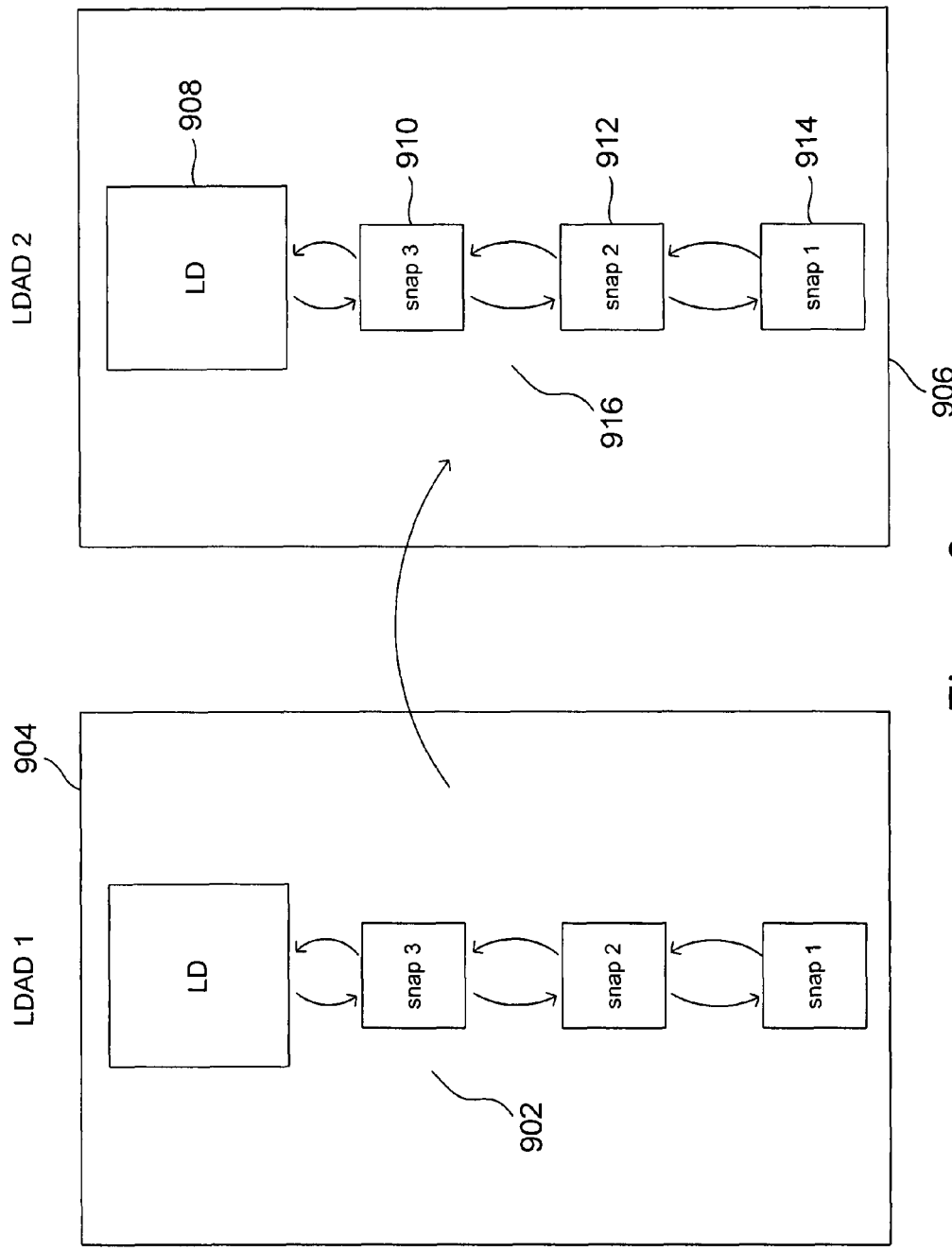
FIG. 9 illustrates a snapshot-tree copy operation.

For various reasons, it would be desirable to provide a snapshot-tree copy operation. FIG. 9 illustrates a snapshot-tree copy operation. As shown in FIG. 9, a snapshot tree 902 in a first LDAD 904 needs to be copied to a second LDAD 906. Currently, mass-storage systems do not provide a snapshot-tree copy operation. At best, a system administrator would need to employ restore operations in order to transform the snapshot logical devices with a snapshot tree into stand-alone logical devices, and then copy each of the separate logical devices. However, such a restore-based copy of a snapshot tree does not produce an equivalent snapshot tree, but instead produces a sequence of stand-alone logical devices that reflect the data state captured at particular points in time represented by the original snapshot logical devices. Moreover, the restore-based snapshot-tree copy results in significant expansion in the amount of data-storage space needed to store the copy snapshot tree. The original snapshot tree 902 is efficiently stored, as illustrated in FIG. 8G. However, using a restore-based snapshot-tree copy operation, the resulting copy snapshot tree would essentially consist of four different, complete versions of the source logical device, rather than containing the sparse snapshot logical devices contained in the original snapshot tree 902.

The present invention provides a true snapshot-tree copy operation, as illustrated in FIG. 9, that preserves the logical structure of the original snapshot tree. The snapshot-tree copy operation of the present invention is first discussed, below, using the example snapshot logical tree shown in FIG. 8G. Following this discussion, control-flow diagrams are provided to illustrate a snapshot-tree copy that represents one embodiment of the present invention.

FIGS. 10A-K illustrate a snapshot-tree-copy operation according to one embodiment of the present invention. FIGS. 10A-K all employ the same illustration conventions, described next with reference to FIG. 10A.

Figure 10A:
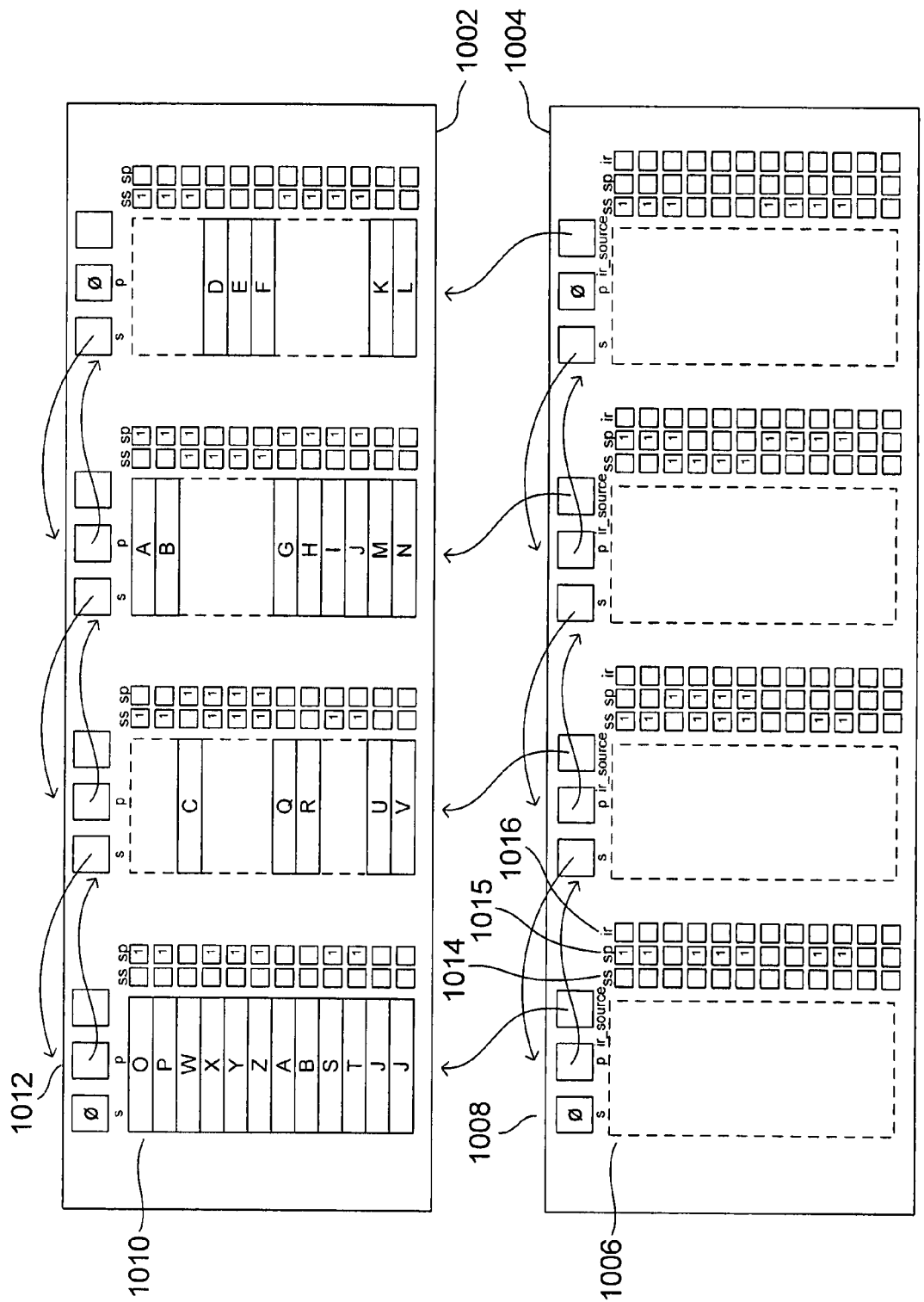
FIGS. 10A-K illustrate a snapshot-tree-copy operation according to one embodiment of the present invention.
Figure 10B:
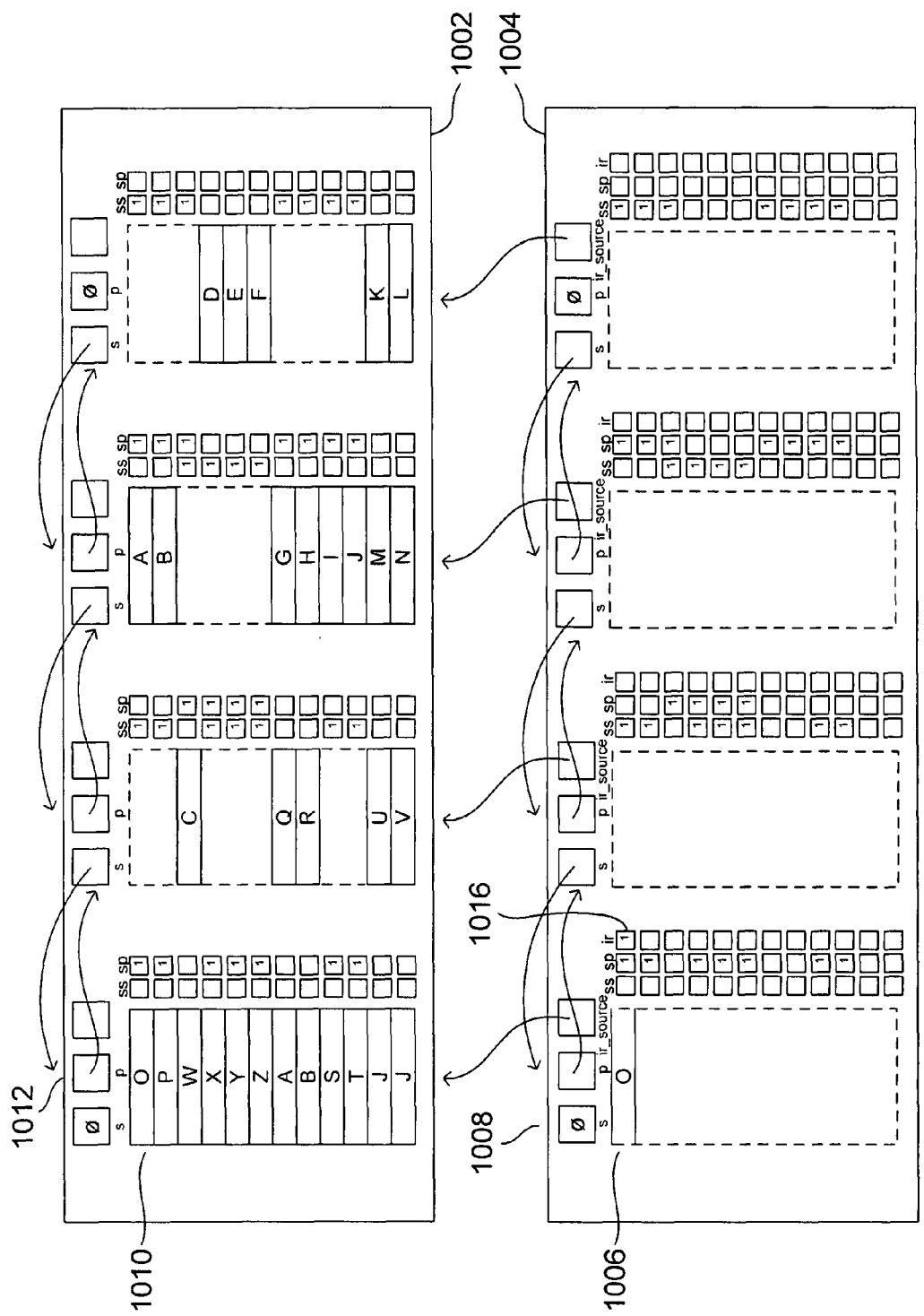

FIG. 10A shows the initial step in the snapshot-tree-copy operation that represents one embodiment of the present invention. In FIG. 10A, the source, or original, snapshot tree shown in FIG. 8G 1002 is represented exactly as in FIG. 8G. In a first step, a data-structure framework is created for the copy snapshot tree 1004 produced by the snapshot-tree-copy operation that represents an embodiment of the present invention. As shown in FIG. 10A, initially, no data is copied from the source snapshot tree 1002 into the copy snapshot tree 1004. However, snapshot-copy-tree data-structure-framework is essentially identical to the data-structure framework of the source snapshot tree. In addition, in FIG. 10A, and in subsequent figures, the ir bit fields for each Rseg in the snapshot-tree copy 1004 are shown. Initially, the ss and sp bits for all of the snapshot-tree-copy Rsegs are copied identically from the corresponding ss and sp bits of the source snapshot tree. All of the ir bits for Rsegs in the copy snapshot tree are initially cleared. Also, in the copy snapshot tree 1004, the ir_source fields associated with each logical device are initialized to reference the corresponding source-snapshot-tree logical device. For example, consider the first Rseg 1006 in the first logical device 1008 of the copy snapshot tree 1004. This Rseg 1006 corresponds to the first Rseg 1010 of the original logical device 1012 of the source snapshot tree 1002. The ss 1014 and sp 1015 bits of this first Rseg 1006 are set to the contents of the ss and sp bits associated with the corresponding Rseg 1010 in the source snapshot tree 1002. The ir bit 1016 associated with the first Rseg 1006 is cleared.

Figure 10C:
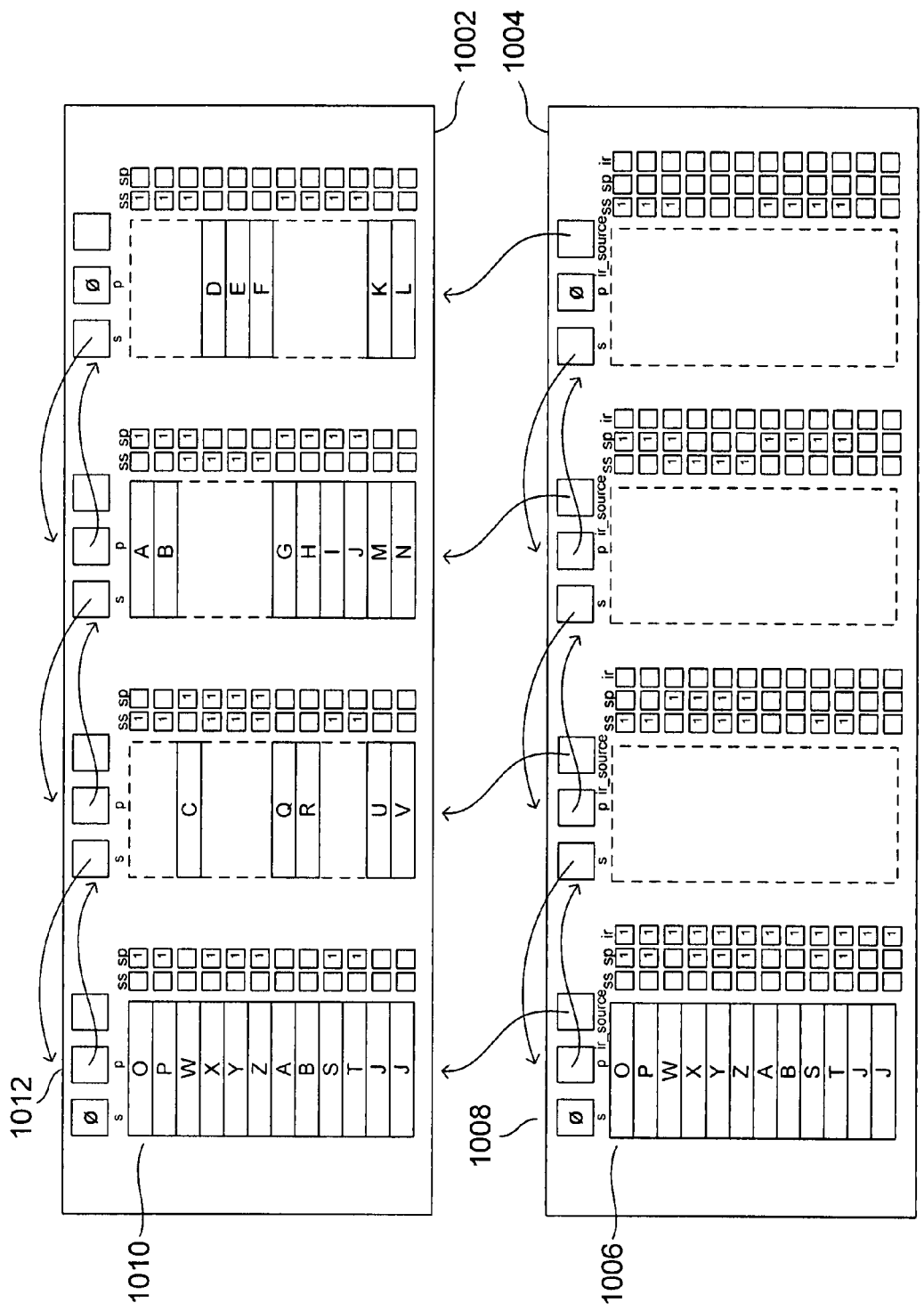

Once the data-structure framework for the copy snapshot tree has been created, as shown in FIG. 10A, the copy snapshot tree can be immediately written to and read from, even though it does not yet contain data. A background copy process is launched in order to copy data from the source snapshot tree 1002 into the copy snapshot tree 1004, while the copy snapshot tree 1004 is essentially live, and accessible. The background copy process is illustrated in FIG. 10B-G. The background copy process considers each logical device within the copy snapshot tree in order, starting with the logical device corresponding to the source logical device in the source snapshot tree. In alternative embodiments, the Rsegs of the copy snapshot tree may be processed in different orders, with logical devices, for example, of the snapshot tree processes in parallel. Thus, in FIG. 10B, in the first step in the background copy process, the first Rseg 1006 of the first logical device of the copy snapshot tree 1004 is considered. Initially, the ir bit associated with this Rseg was cleared, as shown in FIG. 10A. This means that data for the Rseg must be copied from the source snapshot tree 1002. Therefore, the contents of the corresponding Rseg 1010 in the source snapshot tree 1002 are copied into a newly allocated Rseg within the copy snapshot tree 1004, and the ir bit 1016 is set to "1," to indicate that the Rseg has been processed by the background-copy process. As shown in FIG. 10C, this process continues, Rseg-by-Rseg, and results in the first logical device 1008 within the copy snapshot tree 1004 being fully allocated and containing data copied from the source snapshot tree 1002.

Figure 10D:
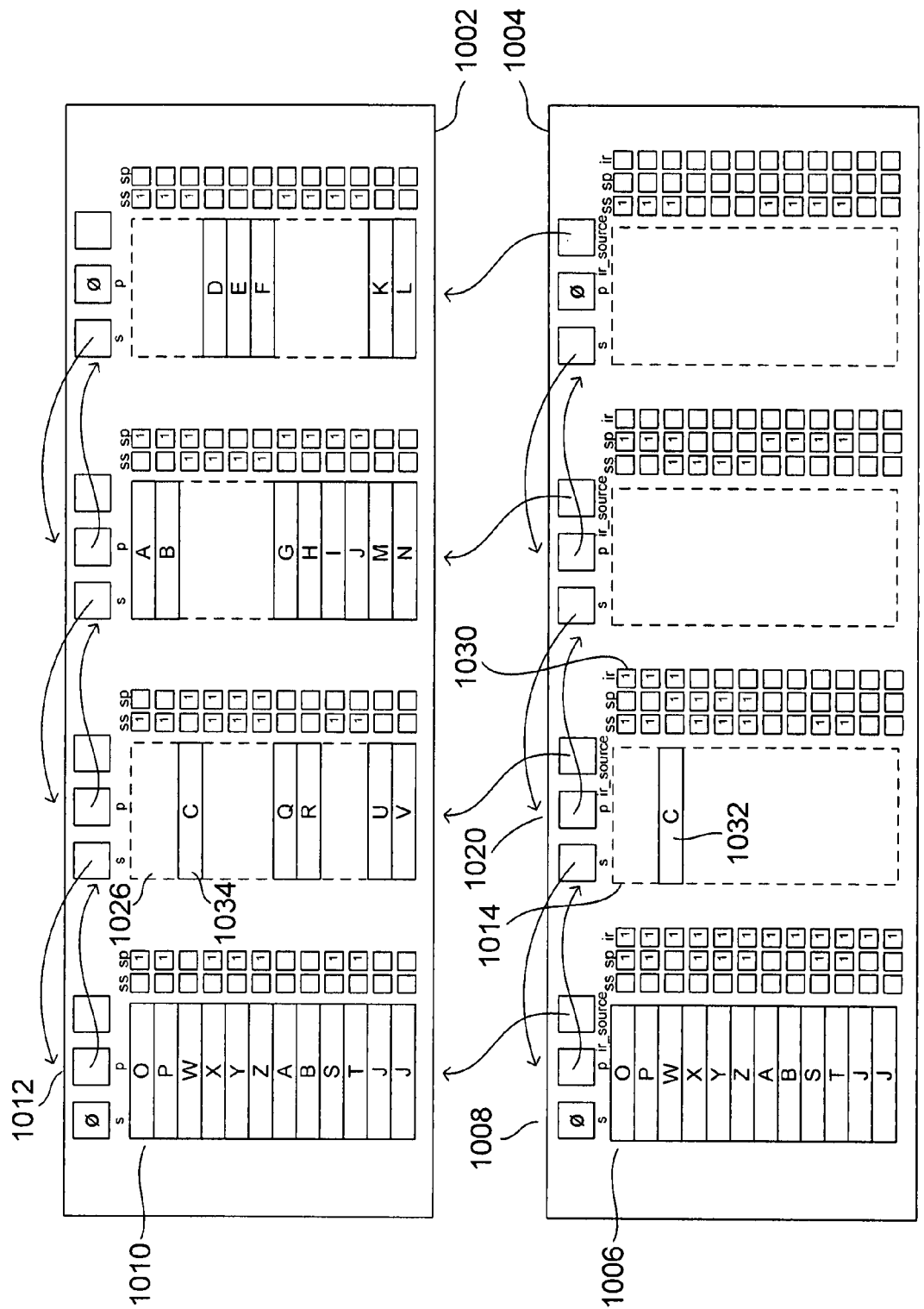
Figure 10E:
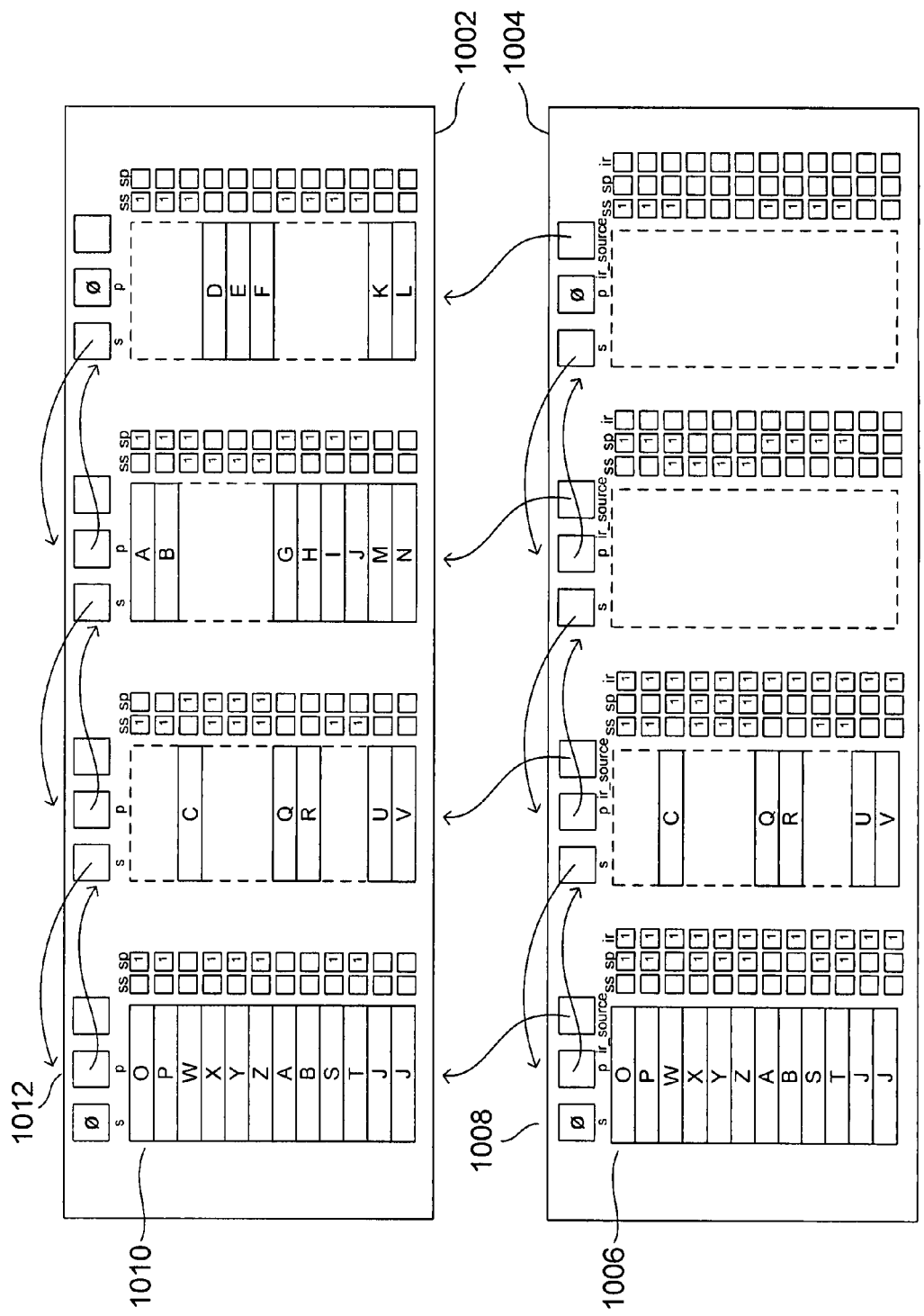

Next, as shown in FIG. 10D, attention turns to the second logical device 1020 in the copy snapshot tree 1004. The Rseg in the source snapshot tree 1026 corresponding to the first Rseg 1024 in the second logical device 1020 of the copy snapshot tree 1004 does not contain data, as indicated by the ss bit being set. Therefore, no data is copied into Rseg 1024, but the ir bit 1030 associated with Rseg 1024 is set to indicate that Rseg 1024 has been considered by the background-copy process. Consideration, by the background-copy process, of the first Rseg 1032 in the second logical device 1020 of the copy snapshot tree 1004 with an associated ir bit that is not set and an associated ss bit that is not set, results in allocation of a new physical storage space for the Rseg 1032 of the second logical device 1020 and copying of data from the corresponding Rseg 1034 from the source snapshot tree 1002 into the newly allocated Rseg 1032. As shown in FIG. 10E, this process continues until all of the Rsegs in the second logical device 1020 of the copy snapshot tree 1004 have been considered. Note that, as a result of consideration by the background process, all of the Rsegs containing data in the corresponding logical device 1036 in the source snapshot tree 1002 resulted in allocation of Rsegs in the second logical device 1020 in the copy snapshot tree 1004 and copying of the contents of the Rsegs in the source snapshot tree 1002 into the corresponding Rsegs of the second logical device 1020 of the copy snapshot tree 1004.

Figure 10F:
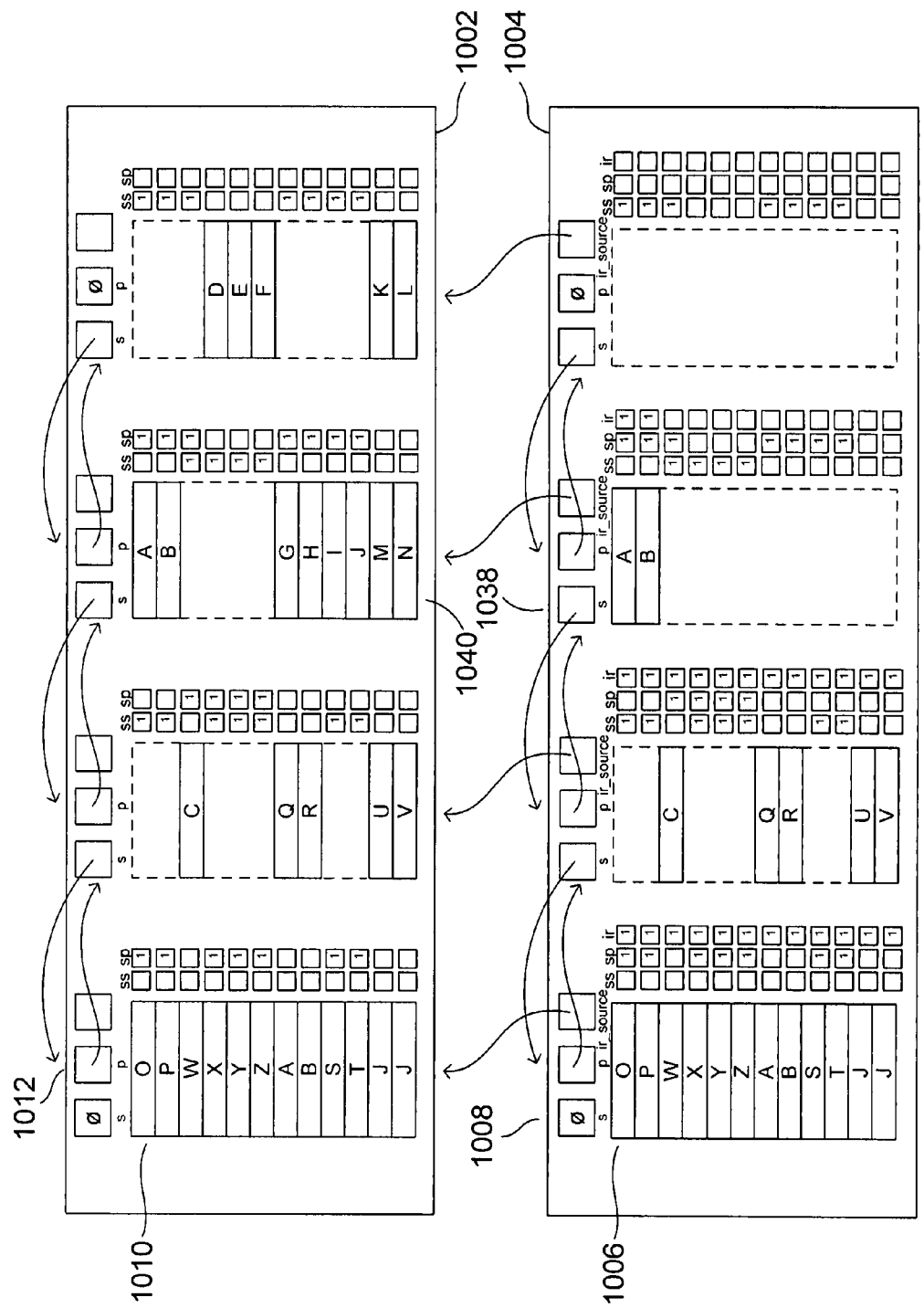
Figure 10G:
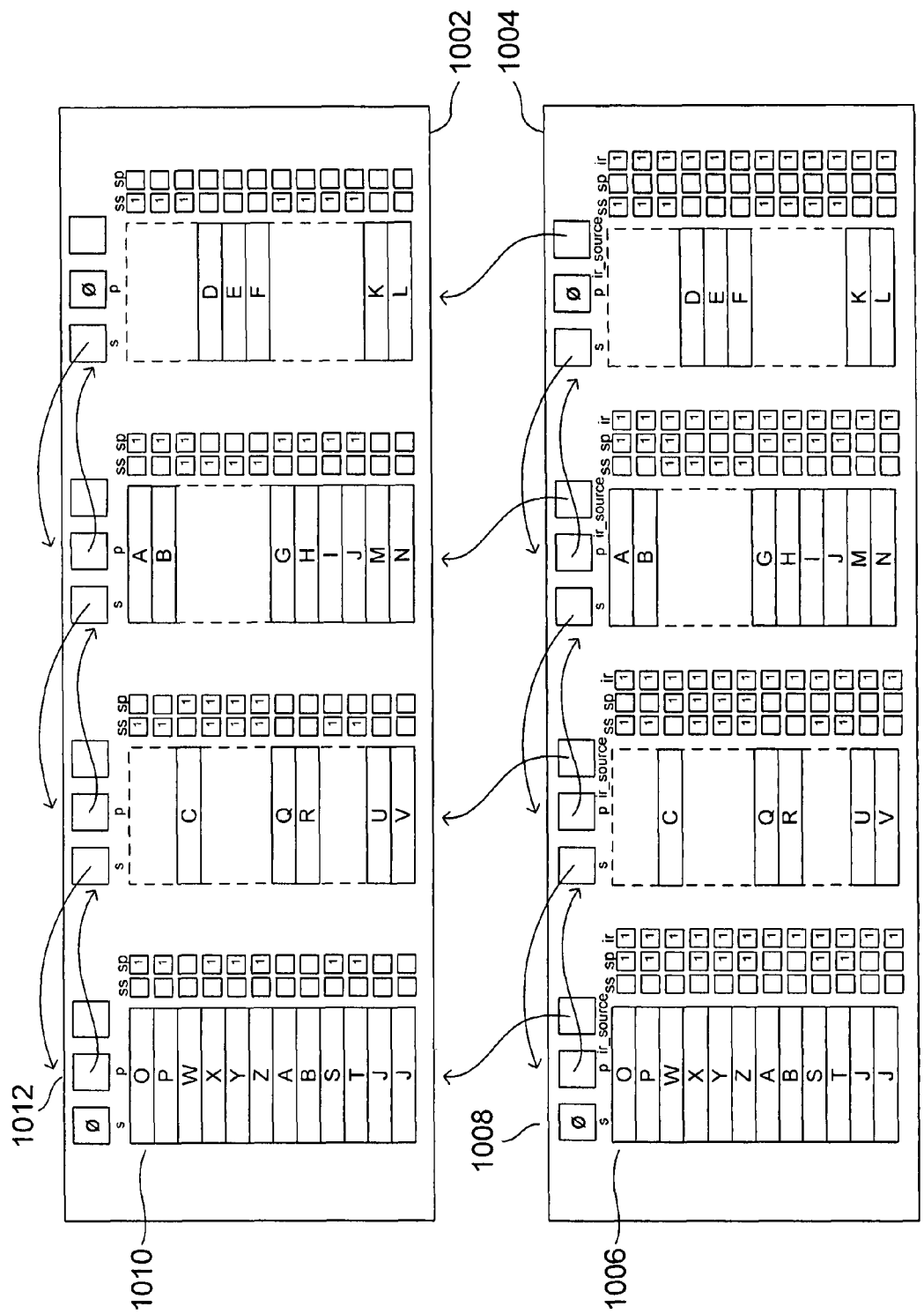

Next, as shown in FIG. 10F, the background process considers the third logical device 1038 in the copy snapshot tree 1004 and begins to copy data, as needed, from the corresponding logical device 1040 of the source snapshot tree 1002. FIG. 10G illustrates completion of the background-copy process, after which the contents of the copy snapshot tree 1004 are identical to the contents of the source snapshot tree 1002. Of course, actual numerical contents of the data structures representing the copy snapshot tree are not identical to the numerical contents of the data structures representing the source snapshot tree since, for example, the detailed information within RSD data structures within the data-structure framework describing the copy snapshot tree may be quite different from corresponding details in the RSD data structures for the source snapshot tree 1002. These differences reflect a generally different mapping of the logical structure of the copy snapshot tree to physical devices than the mapping of logical structures of the source snapshot tree 1002 to physical storage. However, the copy snapshot tree 1004 is logically identical to the source snapshot tree 1002.

Figure 10H:
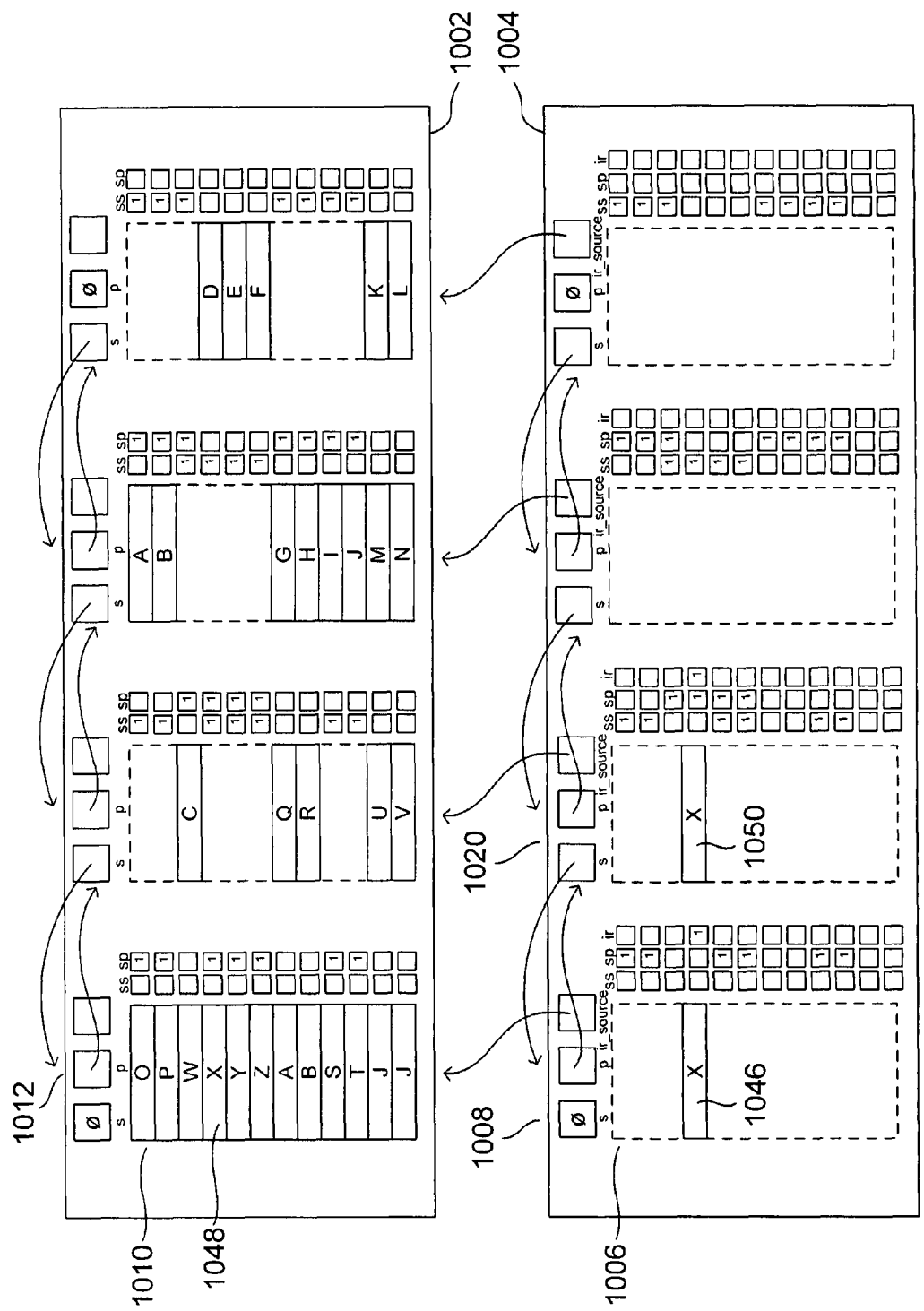
Figure 10I:
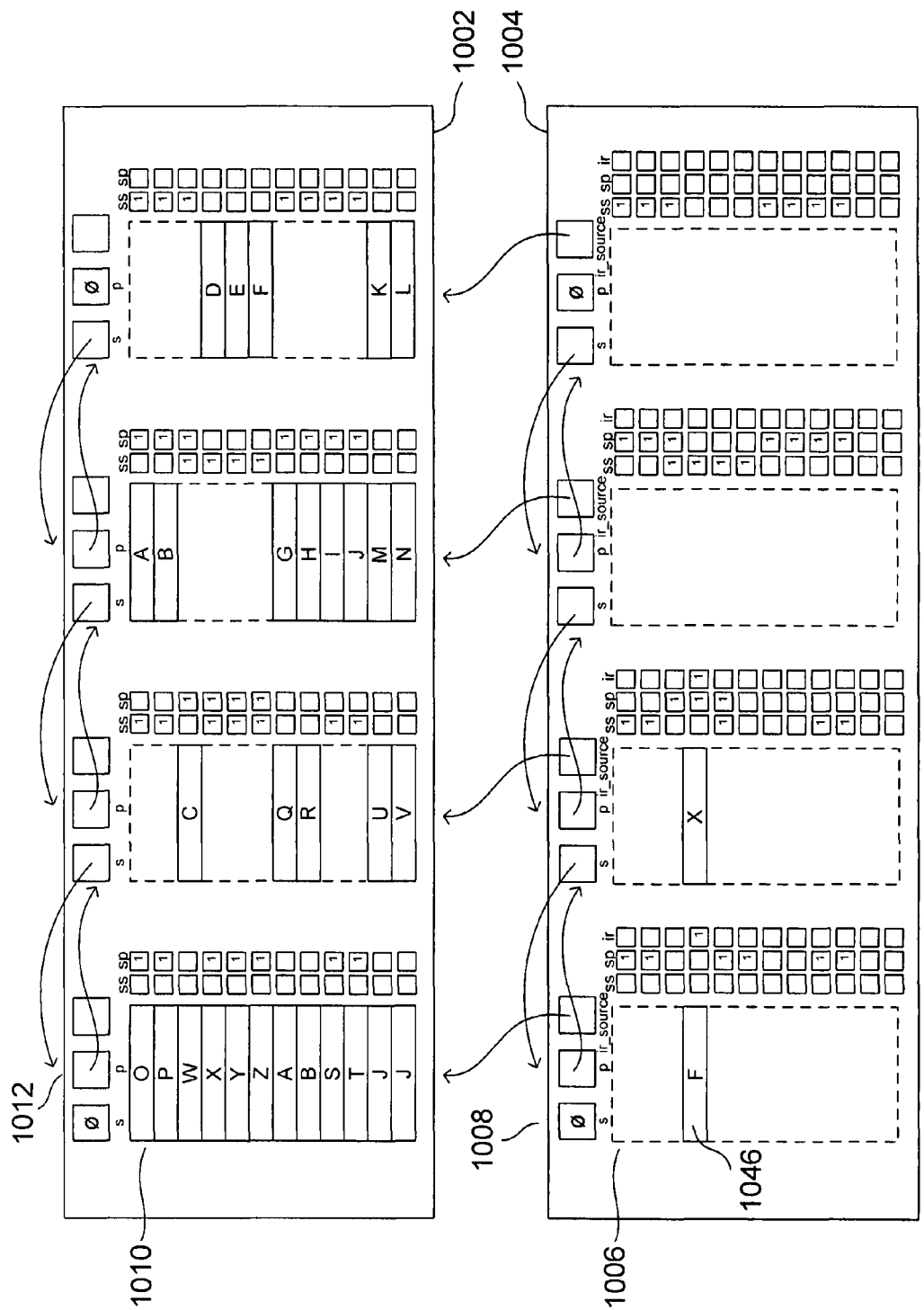

FIGS. 10H-I illustrate a WRITE operation directed to the copy snapshot tree while the background-copy-process is executing. As shown in FIG. 10H, a WRITE operation is directed to Rseg 1046 in the first logical device 1008 of the copy snapshot tree 1004. However, the background-copy process has not yet begun copying data from the source snapshot tree 1002 to the copy snapshot tree 1004. In order to carry out the WRITE operation, the corresponding Rseg 1048 in the source snapshot tree 1002 is located, and the contents of that Rseg are copied to Rseg 1046, as well as to Rseg 1050 in the second logical device 1020 in the copy snapshot tree 1004, since, as shown in FIG. 10A, Rseg 1050 of the second logical device 1020 originally depended on the successor Rseg 1046. When the data is copied into Rseg 1050, the ss bit associated with Rseg 1050 is cleared and the ir bit associated with Rseg 1050 is set, and the sp bit associated with Rseg 1046 is also cleared, to break the dependence between the two Rsegs. Finally, as shown in FIG. 10I, a new data value can be written into Rseg 1046 to carry out the WRITE operation, with the ir bit associated with Rseg 1046 also set, to indicate that Rseg 1046 need not be considered by the background-copy process. Thus, WRITE operations can be directed to the copy snapshot tree even when the background-copy process has not yet completed.

Figure 10J:
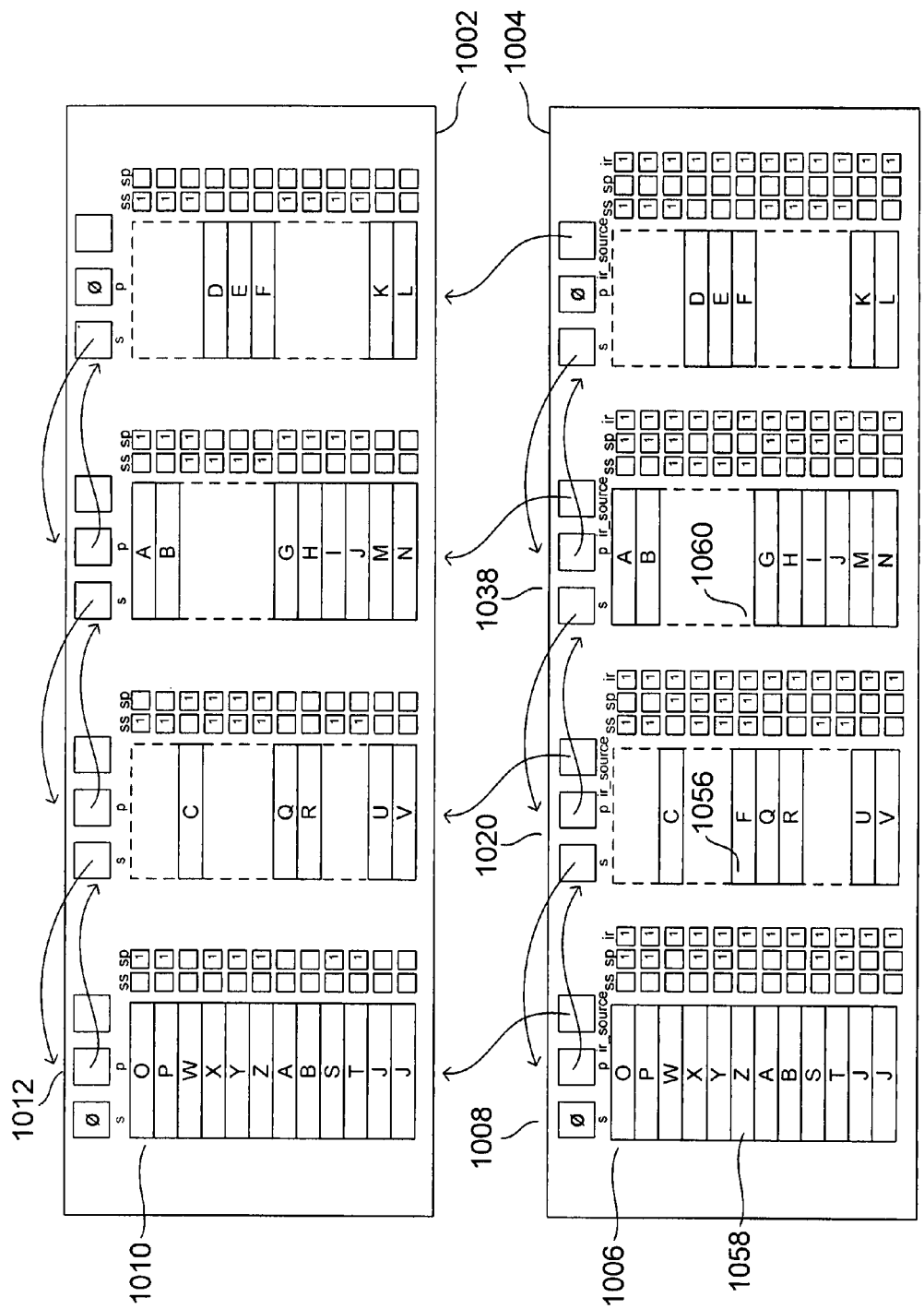
Figure 10K:
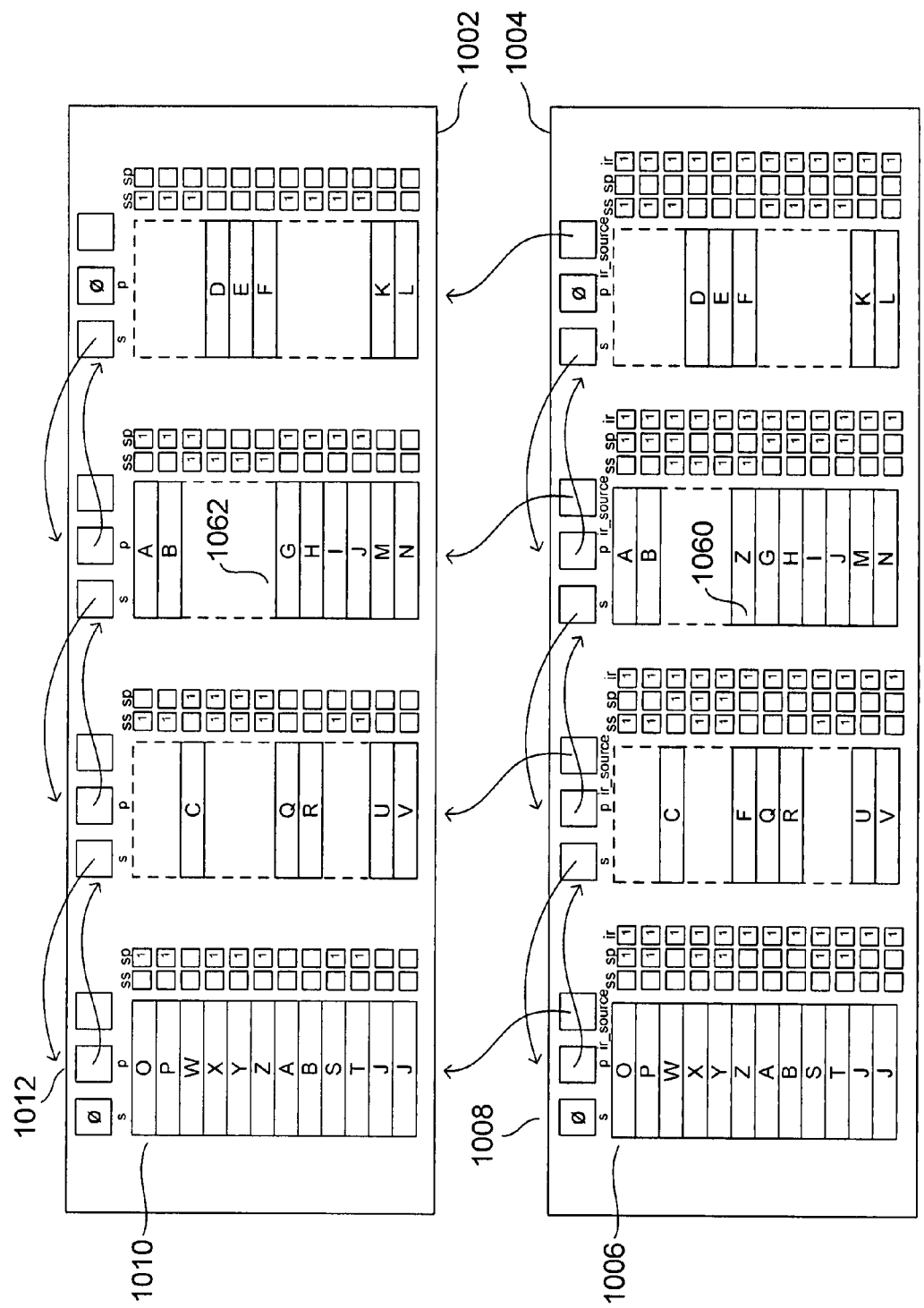

FIGS. 10J-K illustrate a WRITE operation directed to the second logical device of the copy snapshot tree while the background-copy process is executing. As shown in FIG. 10J, a new value is written to Rseg 1056 of the second logical device 1020 in the copy snapshot tree 1004. This Rseg did not contain data in the source snapshot tree 1002. Therefore, new physical storage is allocated for Rseg 1056 to contain the data, and the ss bit associated with the Rseg is cleared and the sp bit of the corresponding Rseg 1058 and the successor logical device 1008 is also cleared, to break the dependency between Rseg 1056 and Rseg 1058. In addition, the sp bit associated with Rseg 1056 is also cleared, so that, when the background process eventually considers Rseg 1060 in the third logical device 1038 in the copy snapshot tree 1004, the background-copy process will know to find data for a newly allocated Rseg 1060 from the source snapshot tree 1002. Later, as shown in FIG. 10K, the background-copy process considers Rseg 1060 and recognizes, due to the cleared sp bit of Rseg 1056, that the background-copy process must find data in the source snapshot tree 1002. The background-copy process follows the ir_source pointer to the corresponding snapshot logical device in source snapshot tree 1002. Because the ss bit associated with corresponding Rseg 1062 is set, the background-process follows the chain of dependence from the corresponding Rseg 1062 in the source snapshot tree to find the data to copy into Rseg 1060.

Figure 11:
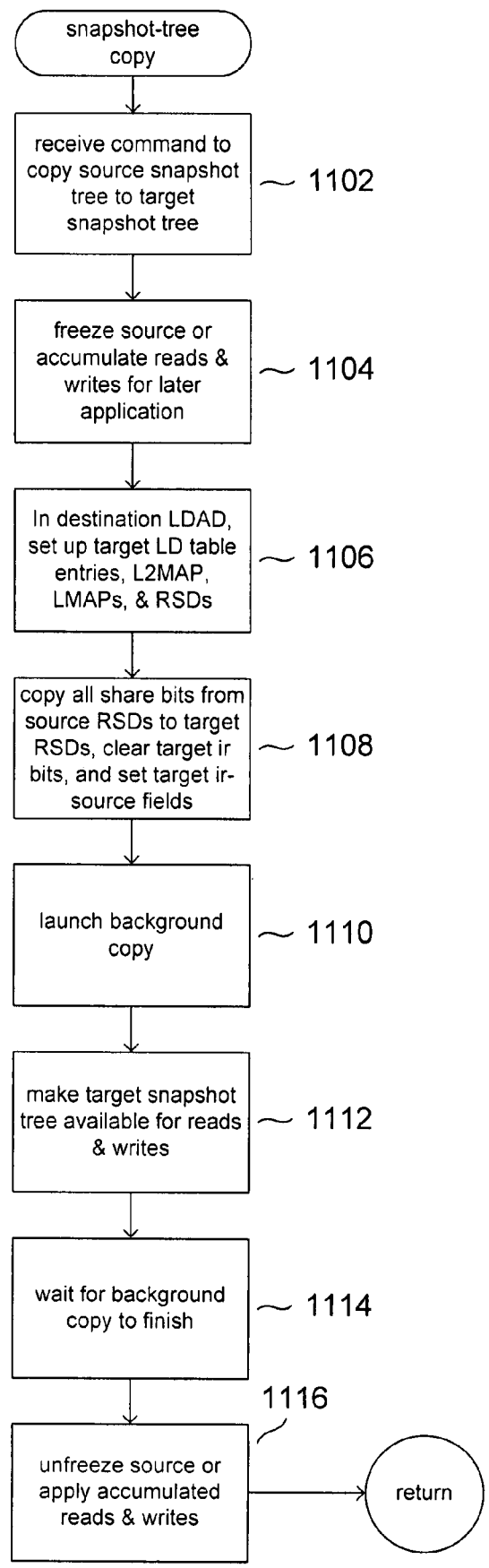
FIG. 11 is a top-level control-flow diagram for the instant snapshot-tree copy operation that represents one embodiment of the present invention.

Next, a series of control-flow diagrams are presented to illustrate a method embodiment of the present invention. FIG. 11 is a top-level control-flow diagram for the instant snapshot-tree copy operation that represents one embodiment of the present invention. In step 1102, the command receives an indication of the snapshot tree to copy and an indication of the domain in which the copy is to be located. As discussed below, the RAID scheme used for the copy snapshot tree may be specified, in an additional parameter, to be different from that of the source snapshot tree. The snapshot tree to be copied is referred to as the "source snapshot tree," and the copy snapshot tree is referred to as the "target snapshot tree." Next, in step 1104, the source snapshot tree is frozen, since the source snapshot tree cannot be modified during the embodiment of the instant snapshot-tree copy discussed with reference to FIG. 11. However, as discussed below, the target snapshot tree is essentially immediately available once a data-structure framework is created for the target snapshot tree. In certain embodiments, WRITEs and READs directed to the source snapshot tree may be accumulated for later application to the source snapshot tree. Next, in step 1106, a data-structure framework for the target snapshot tree is created in the domain, or LDAD, in which the target snapshot tree resides. This involves creating and at least partially populating entries in the logical-device table, L2MAPs, LMAPs, and RSD data structures. FIG. 10A illustrates creation of a data-structure framework. Next, in step 1108, all of the share bits, including the ss and sp bits, of the source snapshot tree are duplicated in the target snapshot tree. The ir bits for the Rsegs of the target snapshot tree are cleared, and the ir_source fields for the target snapshot tree are initialized with pointers to corresponding logical devices in the source-snapshot-tree, as discussed above with reference to FIG. 10A. Next, in step 1110, the background-copy process is launched. In step 1112, the target snapshot tree is made active, or, in other words, available for READs, WRITEs, and other accesses. In step 1114, the snapshot-tree copy routine waits for the background-copy process to finish before unfreezing the source snapshot tree in step 1116 and, optionally, applying any accumulated READs, WRITEs, and other operations which have been directed to the source snapshot tree during the snapshot-tree-copy operation. Alternatively, the snapshot-tree-copy routine can provide a callback reference to the background-copy process, so that when the background-copy process finishes, the background-copy process can call the callback routine to unfreeze the source snapshot tree and, optionally, apply accumulated READs, WRITEs, and other such operations.

Figure 12:
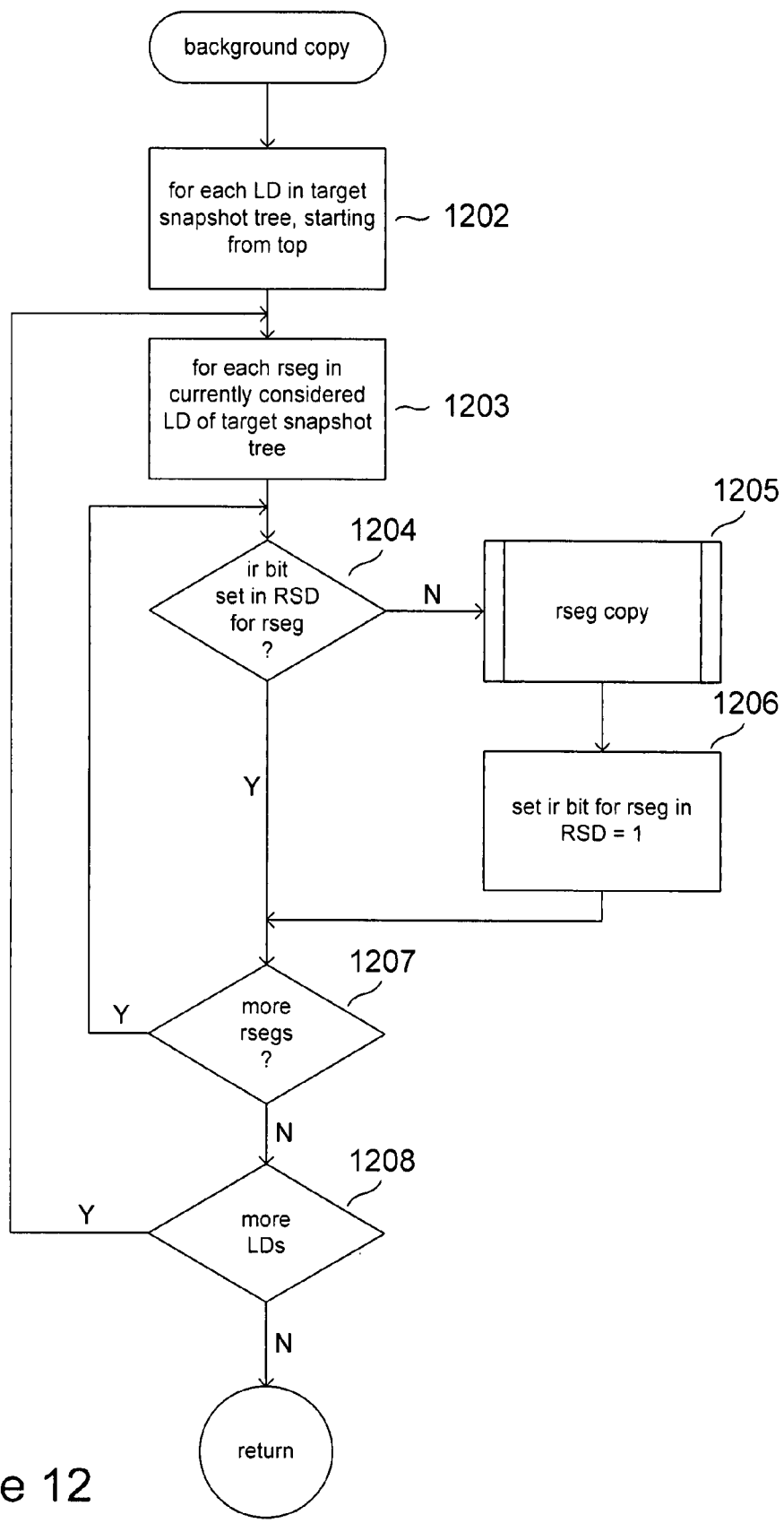
FIG. 12 provides a control-flow diagram for the background-copy process launched in step 1110 of FIG. 11.

FIG. 12 provides a control-flow diagram for the background-copy process launched in step 1110 of FIG. 11. The background-copy process is essentially a for-loop comprising steps 1202-1208. This for-loop considers each logical device, in top-down order, of the target snapshot tree. Thus, for example, returning to FIG. 9, this for-loop first considers logical device 908, next logical device 910, next logical device 912, and finally logical device 914 of target snapshot tree 916. The source logical device for the snapshot tree is first considered, and then each snapshot logical device is considered in reverse order of the time of creation of the snapshot logical devices, as they are linked into the snapshot tree. Steps 1203-1207 comprise an inner for-loop, in which each Rseg in the currently considered logical device of the target snapshot tree is considered. In step 1204, the background-copy process accesses the ir bit associated with the currently considered Rseg and determines whether or not the ir bit is set to "1". If the ir bit is not set, then the background-copy process calls the routine "Rseg copy," in step 1205, to, in certain cases, allocate data-storage space for the currently considered Rseg and copy data from the source snapshot tree into the currently considered Rseg, as discussed above with reference to FIGS. 10B-10G. Then, in step 1206, the background-copy process sets the ir bit for the currently considered Rseg to indicate that the currently considered Rseg has been considered by the background-copy process. If there are more Rsegs in the currently considered logical device, as determined in step 1207, control flows back to step 1204. Otherwise, if there are more logical devices in the target snapshot tree, as determined in step 1208, the control flows back to step 1203.

Figure 13:
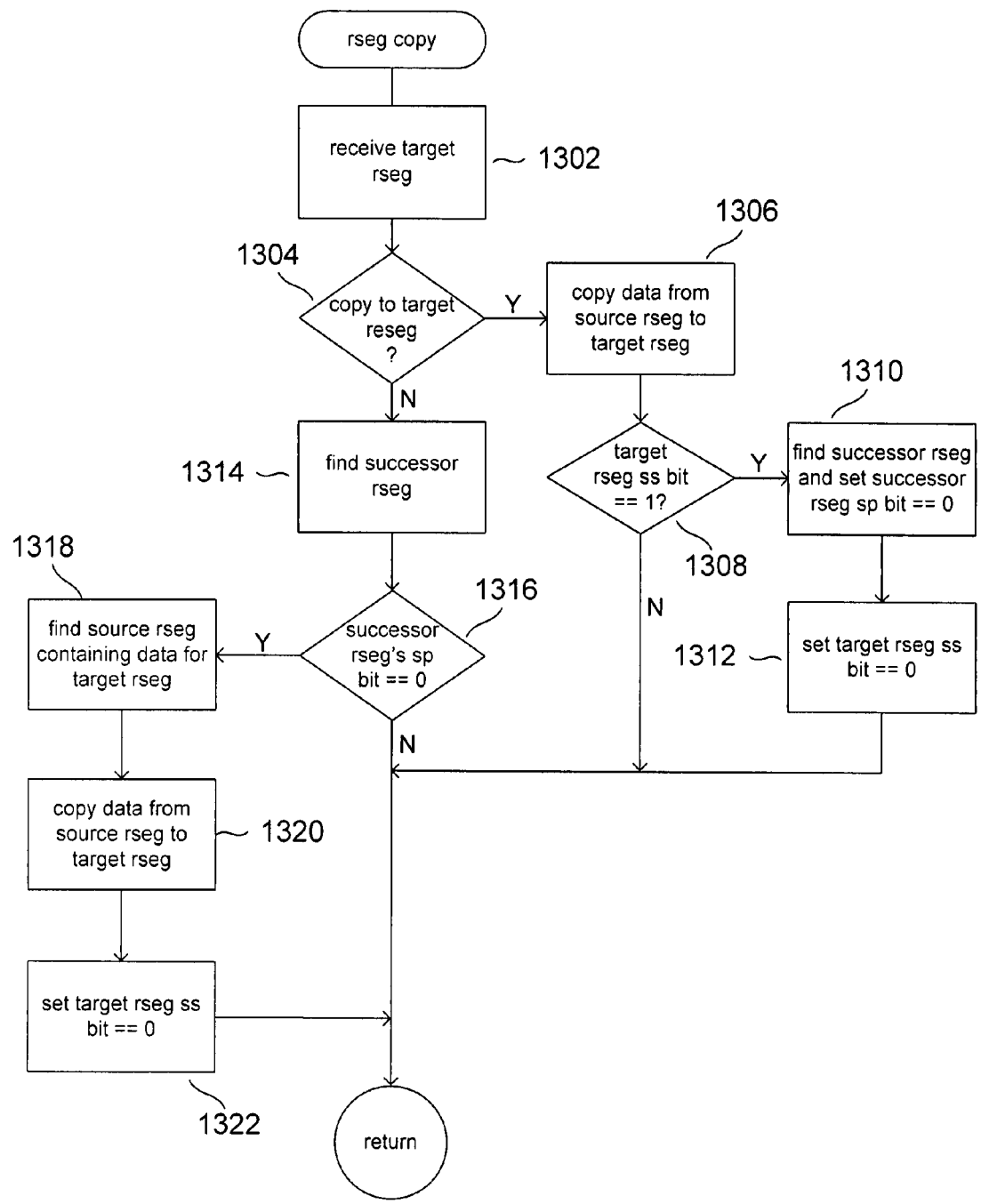
FIG. 13 is a control-flow diagram for the routine "Rseg copy" called in step 1205 of FIG. 12.

FIG. 13 is a control-flow diagram for the routine "Rseg copy" called in step 1205 of FIG. 12. In step 1302, the routine "Rseg copy" receives an indication of the currently considered target-snapshot-tree Rseg. When the background-copy process determines that data needs to be copied to the target Rseg, as determined in step 1304, then, in step 1306, the routine "Rseg copy" copies the data from the referenced source-snapshot-tree Rseg to a physical storage space allocated for the target Rseg. The determination in step 1304 can be made by determining whether or not the ss bit of the corresponding Rseg in the source snapshot tree is clear, with a cleared ss bit indicating that the corresponding Rseg in the source snapshot tree contains data. If the ss bit associated with the target Rseg is set, as determined in step 1308, then, in step 1310, the corresponding Rseg in a successor logical device within the target snapshot tree is located, and the sp bit associated with the corresponding Rseg and the successor logical device is set to 0. In step 1312, the ss bit associated with the currently considered Rseg is set to 0. Steps 1310 and 1312 break the dependency between the currently considered Rseg and the corresponding Rseg in the successor logical device of the target snapshot tree. When data needs not be copied to the target Rseg, as determined in step 1304, then, in step 1314, the routine "Rseg copy" finds a corresponding Rseg in the successor logical device of the target snapshot tree. If the corresponding Rseg in the successor logical device of the target snapshot tree is associated with an sp bit that is cleared, as determined in step 1316, then the Rseg of the successor logical device has been modified following launching of the background-copy process, and therefore the background-copy process needs to find the data for the currently considered Rseg in the source snapshot tree by following the chain of successors until the data is found, in step 1318, and as described with reference to FIGS. 10J-K. In step 1320, the data located in step 1318 is copied from the source snapshot tree to the currently considered Rseg of the target snapshot tree, and the ss bit associated with the currently considered Rseg is set to 0, in step 1322, to break the dependence on the currently considered Rseg on the corresponding Rseg of the successor logical device.

Figure 14:
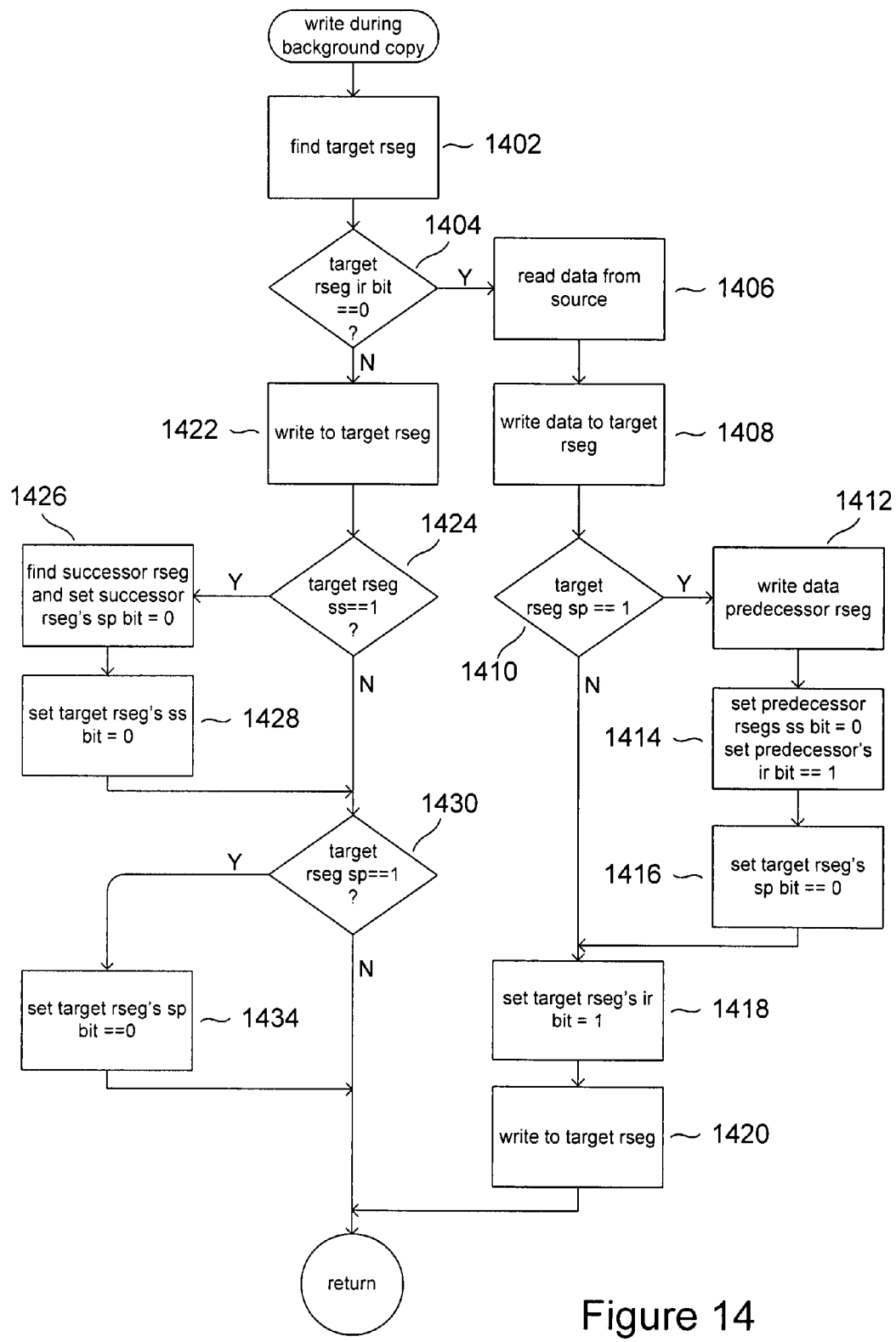
FIG. 14 is a control-flow diagram indicating how a WRITE operation directed to the target snapshot tree is handled while the background-copy process launched in step 1110 of FIG. 11 is executing.

FIG. 14 is a control-flow diagram indicating how a WRITE operation directed to the target snapshot tree is handled while the background-copy process launched in step 1110 of FIG. 11 is executing. In step 1402, a target Rseg for the WRITE operation is located in the target snapshot tree. If the ir bit associated with the target Rseg is cleared, as determined in step 1404, then the background-copy process has not yet considered the Rseg. In that case, data corresponding to the target Rseg is read from the source snapshot tree, in step 1406, and written to the target Rseg in step 1408. If the target Rseg is associated with an sp bit having the value "1," as determined in step 1410, the target Rseg shares data with a predecessor logical device within the target snapshot tree. In that case, the data read from the source snapshot tree in step 1406 is also written to a corresponding predecessor-logical-device Rseg, in step 1412, and, in steps 1414 and 1416, the ss bit of the corresponding Rseg in the predecessor logical device is cleared, the ir bit in the corresponding Rseg in the predecessor logical device is set to "1," and the sp bit of the target Rseg is cleared, to break the dependency between the target Rseg and the corresponding Rseg in the predecessor logical device as well as to alert the background-copy process that the Rseg of the predecessor logical device has been previously handled, and does not need to be considered by the background-copy process. In step 1418, the ir bit associated with the target Rseg is also set, to avoid subsequent consideration of the target Rseg by the background-copy process. Finally, in step 1420, the WRITE operation directed to the target Rseg can be carried out. Note that, a given WRITE operation may not modify the entire contents of an Rseg. Therefore, the data state of the target Rseg must first be brought up to that of the source snapshot tree, in steps 1406, 1408, 1410, and 1418, prior to executing a WRITE operation to the Rseg in step 1420.

When the target Rseg for the WRITE operation has already been considered by the background-copy process, as determined in step 1404, then the WRITE can be immediately directed to the target Rseg, in step 1422. Then, if the ss bit associated with the target Rseg is set, as determined in step 1424, the corresponding Rseg in a successor logical device within the target snapshot tree needs to be located so that the sp bit of the corresponding Rseg in the successor logical device can be cleared in step 1426. The target Rseg's ss bit is also cleared, in step 1428. Steps 1426 and 1428 break the dependency between the target Rseg and the corresponding Rseg of the successor logical device. If the sp bit associated with the target Rseg is set to "1," as determined in step 1430, then the sp bit associated with the target Rseg is cleared in step 1434. Step 1434 partially breaks the dependency between the target and the corresponding Rseg of the predecessor logical device. Partial removal of the dependency alerts the background-copy process that the background-copy process needs to find data for the corresponding Rseg of the predecessor logical device in the source snapshot tree in steps 1318 and 1320 in FIG. 13.

Figure 15:
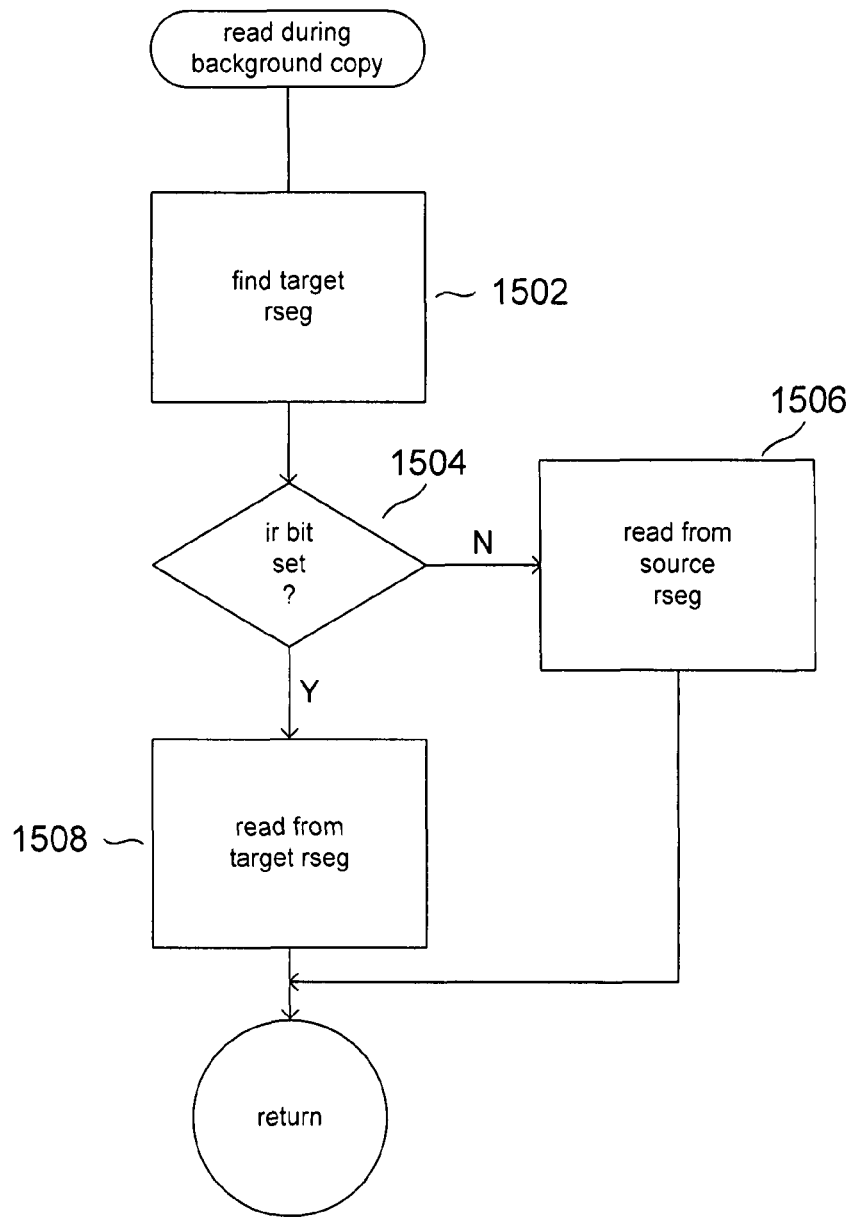
FIG. 15 provides a simple control-flow diagram for executing a READ operation directed to the target snapshot tree during execution of the background-copy process.

Finally, FIG. 15 provides a simple control-flow diagram for executing a READ operation directed to the target snapshot tree during execution of the background-copy process. In step 1502, the target Rseg for the READ is located in the target snapshot tree. If the ir bit associated with the target Rseg is set, as determined in step 1504, then the READ is satisfied by accessing the corresponding Rseg in the target snapshot tree, in step 1508. Otherwise, the READ is executed with respect to the target Rseg in the source snapshot tree, in step 1506.

While the instant snapshot-tree copy operation has been discussed, above, reference to a particular data-storage interface and a particular set of data structures that describe logical devices within the data-storage interface, the instant snapshot-tree copy operation of the present invention can be implemented in any of a large number of different types of mass-storage systems using many different data-storage interfaces and different data structures describing data objects stored via the data-storage interface, with a variety of different software and firmware implementations. In the described embodiment, the target snapshot tree is essentially immediately available for READ and WRITE operations, even while the background-copy process is executing, but the source snapshot tree is not available during the execution of the background-copy process. In alternative, more complex embodiments, both the source snapshot tree and the target snapshot tree can be made essentially instantly available for continuing READ and WRITE operations. As with any software implementation, careful use of critical sections needs to be made in routines that access data structures, such as in the background-copy process and in routines that carry out READ and WRITE operations directed to either the source or target snapshot tree during the snapshot-tree-copy operation. For example, critical sections in the code are necessary to avoid the background-copy process considering a target-copy-tree Rseg just after a WRITE operation directed to the target Rseg has begun to be carried out.

The instant snapshot-tree copy operation provides a number of advantages and desirable features to system administrators, to automated logical-device management routines, and to designers and developers of data-storage interfaces and mass-storage systems. First, snapshot trees can be copied in one operation, resulting in a logically equivalent snapshot tree that can be placed in a different LDAD from the LDAD containing the source snapshot tree. The copy snapshot tree is immediately available for READ, WRITE, and other access operations. Moreover, a snapshot-tree copy can be implemented to use a different redundant-data-storage scheme for Rstores of the copy snapshot tree than used for the source snapshot copy tree. As discussed above, the instant snapshot-tree copy operation of the present invention is not dependent on the detailed information contained in the RSD data structures that specify the redundant-data-storage scheme. The data-structure framework initially created for the copy snapshot tree can therefore be initialized to specify any of the possible redundant-data-storage schemes.

Although the present invention has been described in terms of particular embodiments, it is not intended that the invention be limited to these embodiments. Modifications within the spirit of the invention will be apparent to those skilled in the art. For example, many different implementations of the instant snapshot-tree copy operation that represents an embodiment of the present invention are possible, with variations in a variety of different implementation parameters, such as modular organization, data structures, control structures, programming languages, implementation platforms, and other such parameters. While relatively small snapshot trees are discussed in the examples above, the instant snapshot-tree-copy operation of the present invention may be carried out on snapshot trees of arbitrary size. In the embodiment of the present invention discussed above, particular fields in address fields associated with Rsegs in the RSD data structure are employed for bookkeeping during the instant snapshot-tree operation. In alternative embodiments, separate data structures could be used for this purpose, or, in yet additional embodiments, alternative bit fields and reference fields in the Rseg, and Rseg-like data structures, or in other data structures may be employed. As discussed above, the instant-snapshot-tree copy operation that represents an embodiment of the present invention may be implemented in a wide variety of different types of mass-storage systems using different architectures, data-storage interfaces, and data-structure representations of data objects stored within the mass-storage systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for copying a source snapshot tree to a target snapshot tree, the method comprising:
   inactivating the source snapshot tree to prevent access to the source snapshot tree;
   creating a data-structure framework to represent the target snapshot tree;
   making the target snapshot tree immediately available for storage access by a host computer even though the target snapshot tree does not yet contain data;
   launching a background-copy process to copy data from the source snapshot tree to the target snapshot tree; and
   when the background-copy process has completed, making the source snapshot tree again available for access, wherein the source snapshot tree and target snapshot tree each comprises:
   a linked list of logical devices that include
   a top logical device that is a source logical device for snapshot operations; and
   snapshot logical devices generated from the source logical device ordered in reverse order with respect to time of creation, with a first-created snapshot logical device occupying the bottom-logical-device position; and
   wherein a second logical device closer, in the linked list, to the top logical device than a first logical device is a successor logical device with respect to the first logical device with respect to the first logical device and a third logical device closer, in the linked list, to the bottom logical device than the first logical device is a predecessor logical device with respect to the first logical device.

2. The method of claim 1 wherein the data-structure framework includes:
   a representation of the target snapshot tree that includes representations of each logical device in the target snapshot tree, each logical-device representation including descriptions of the data-storage units that together compose the logical device.

3. The method of claim 1 wherein the background-copy process copies data from the source snapshot tree to the target snapshot tree by:
   for each currently considered logical-device representation of the target snapshot tree representation, beginning with the representation of the top logical device and proceeding in order to the representation of the bottom logical device,
   for each currently considered data-storage-unit description included in the currently considered logical-device description,
   when the currently considered data-storage-unit description is associated with an indication that the data-storage unit described by the currently considered data-storage-unit description has not been modified since launching of the background-copy process,
   updating the currently considered data-storage-unit description and the data-storage unit described by the currently considered data-storage-unit description to reflect a data-state of a corresponding data-storage unit of the source snapshot tree; and
   modifying the currently considered data-storage-unit description with an indication that the currently considered data-storage-unit description has been modified since launching of the background-copy process.

4. The method of claim 3 wherein updating the currently considered data-storage-unit description and the data-storage unit described by the currently considered data-storage-unit description to reflect a data-state of a corresponding data-storage unit of the source snapshot tree further comprises:
   when the currently considered data-storage-unit description includes a reference to a corresponding data-storage unit in the source snapshot tree,
   copying data from the corresponding data-storage unit in the source snapshot tree to the data-storage unit described by the currently considered data-storage-unit description; and
   removing any dependency between the data-storage unit described by the currently considered data-storage-unit description and a corresponding data-storage unit in a successor logical device within the target snapshot tree.

5. The method of claim 3 further comprising:
   when the currently considered data-storage-unit description does not include a reference to a corresponding data-storage unit in the source snapshot tree, and when a dependency of the data-storage unit described by the currently considered data-storage unit description on a corresponding data-storage unit in a successor logical device within the target snapshot tree has been partially removed, finding a data-storage unit in the source snapshot tree corresponding to the data-storage unit described by the currently considered data-storage-unit description;

copying data from the corresponding data-storage unit in the source snapshot tree to the data-storage unit described by the currently considered data-storage-unit description; and fully removing the dependency of the data-storage unit described by the currently considered data-storage-unit description on the corresponding data-storage unit in the successor logical device within the target snapshot tree.

6. The method of claim 1 further comprising executing a write operation directed to the target snapshot tree while the background-copy process is executing by:

locating a description of the target data-storage unit for the write operation within the representation of the target snapshot tree;

when the description of the target data-storage unit includes an indication that the target data-storage unit has not yet been modified, updating the data-state of the target data-storage unit to reflect the data state of a corresponding data-storage unit in the source snapshot tree, and executing the write operation to the target data-storage unit; and when the description of the target data-storage unit includes an indication that the target data-storage unit has been modified, executing the write operation to the target data-storage unit, and removing or partially removing dependencies of the target data-storage unit.

7. The method of claim 6 wherein updating the data-state of the target data-storage unit to reflect the data state of a corresponding data-storage unit in the source snapshot tree further comprises:

reading update data from the corresponding data-storage unit in the source snapshot tree;

writing the update data to the target data-storage unit; and when the target data-storage unit is associated with a dependency by a corresponding data-storage unit in a predecessor logical device of the snapshot tree, writing the update data to the corresponding data-storage unit in the predecessor logical device, removing the dependency by the corresponding data-storage unit in the predecessor logical device on target data-storage unit, and including in the description of the target data-storage unit an indication that the target data-storage unit has been modified.

8. The method of claim 6 wherein removing or partially removing dependencies of the target data-storage unit further comprises:

when the target data-storage unit depends on a corresponding data-storage unit in a successor logical device in the target snapshot tree, removing the dependency of the target data-storage unit on the corresponding data-storage unit in the successor logical device; and when a corresponding data-storage unit of a predecessor logical device in the target snapshot tree depends on the target data-storage unit, partially removing the dependency of the corresponding data-storage unit of predecessor logical device on the target data-storage unit.

9. The method of claim 1 further comprising executing a read operation directed to the target snapshot tree while the background-copy process is executing by:

finding a description of the target-snapshot-tree data-storage unit corresponding to the data to be read;

when the description of the target-snapshot-tree data-storage unit includes an indication that the target-snapshot-tree data-storage unit has been modified, returning data from the target-snapshot-tree data-storage unit; and when the description of the target-snapshot-tree data-storage unit includes an indication that the target-snapshot-tree data-storage unit has not been modified, returning data from a source-snapshot-tree data-storage unit corresponding to the target-snapshot-tree data-storage unit.

10. A data-storage system comprising:

data-storage devices;

a data-storage interface that provides domains, each domain containing one or more logical devices composed of data-storage units; and control programs that implement the data-storage interface and that provide for a snapshot-tree operation that copies a source snapshot tree to a target snapshot tree by:

inactivating the source snapshot tree to prevent access to the source snapshot tree;

creating a data-structure framework to represent the target snapshot tree;

making the target snapshot tree immediately available for storage access by a host computer even though the target snapshot tree does not yet contain data;

launching a background-copy process to copy data from the source snapshot tree to the target snapshot tree; and when the background-copy process has completed, making the source snapshot tree again available for access, wherein the source snapshot tree and target snapshot tree each comprises:

a linked list of logical devices that include a top logical device that is a source logical device for snapshot operations; and snapshot logical devices generated from the source logical device ordered in reverse order with respect to time of creation, with a first-created snapshot logical device occupying the bottom-logical-device position; and wherein a second logical device closer, in the linked list, to the top logical device than a first logical device is a successor logical device with respect to the first logical device with respect to the first logical device and a third logical device closer, in the linked list, to the bottom logical device than the first logical device is a predecessor logical device with respect to the first logical device.

11. The data-storage system of claim 10 wherein the data-structure framework includes:

a representation of the target snapshot tree that includes representations of each logical device in the target snapshot tree, each logical-device representation including descriptions of the data-storage units that together compose the logical device.

12. The data-storage system of claim 10 wherein the background-copy process copies data from the source snapshot tree to the target snapshot tree by:

for each currently considered logical-device representation of the target snapshot tree representation, beginning with the representation of the top logical device and proceeding in order to the representation of the bottom logical device, for each currently considered data-storage-unit description included in the currently considered logical-device description,
when the currently considered data-storage-unit description is associated with an indication that the data-storage unit described by the currently considered data-storage-unit description has not been modified since launching of the background-copy process,
updating the currently considered data-storage-unit description and the data-storage unit described by the currently considered data-storage-unit description to reflect a data-state of a corresponding data-storage unit of the source snapshot tree; and
modifying the currently considered data-storage-unit description with an indication that the currently considered data-storage-unit description has been modified since launching of the background-copy process.

13. The data-storage system of claim 12 wherein updating the currently considered data-storage-unit description and the data-storage unit described by the currently considered data-storage-unit description to reflect a data-state of a corresponding data-storage unit of the source snapshot tree further comprises:
when the currently considered data-storage-unit description includes a reference to a corresponding data-storage unit in the source snapshot tree,
copying data from the corresponding data-storage unit in the source snapshot tree to the data-storage unit described by the currently considered data-storage-unit description; and
removing any dependency between the data-storage unit described by the currently considered data-storage-unit description and a corresponding data-storage unit in a successor logical device within the target snapshot tree.

14. The data-storage system of claim 12 further comprising:
when the currently considered data-storage-unit description does not include a reference to a corresponding data-storage unit in the source snapshot tree, and when a dependency of the data-storage unit described by the currently considered data-storage-unit description on a corresponding data-storage unit in a successor logical device within the target snapshot tree has been partially removed,
finding a data-storage unit in the source snapshot tree corresponding to the data-storage unit described by the currently considered data-storage-unit description;
copying data from the corresponding data-storage unit in the source snapshot tree to the data-storage unit described by the currently considered data-storage-unit description; and
fully removing the dependency of the data-storage unit described by the currently considered data-storage-unit description on the corresponding data-storage unit in the successor logical device within the target snapshot tree.

15. The data-storage system of claim 10 further comprising executing a write operation directed to the target snapshot tree while the background-copy process is executing by:
locating a description of the target data-storage unit for the write operation within the representation of the target snapshot tree;
when the description of the target data-storage unit includes an indication that the target data-storage unit has not yet been modified,
updating the data-state of the target data-storage unit to reflect the data state of a corresponding data-storage unit in the source snapshot tree, and
executing the write operation to the target data-storage unit; and
when the description of the target data-storage unit includes an indication that the target data-storage unit has been modified,
executing the write operation to the target data-storage unit, and
removing or partially removing dependencies of the target data-storage unit.

16. The data-storage system of claim 15 wherein updating the data-state of the target data-storage unit to reflect the data state of a corresponding data-storage unit in the source snapshot tree further comprises:
reading update data from the corresponding data-storage unit in the source snapshot tree;
writing the update data to the target data-storage unit; and
when the target data-storage unit is associated with a dependency by a corresponding data-storage unit in a predecessor logical device of the snapshot tree,
writing the update data to the corresponding data-storage unit in the predecessor logical device,
removing the dependency by the corresponding data-storage unit in the predecessor logical device on target data-storage unit, and
including in the description of the target data-storage unit an indication that the target data-storage unit has been modified.

17. The data-storage system of claim 15 wherein removing or partially removing dependencies of the target data-storage unit further comprises:
when the target data-storage unit depends on a corresponding data-storage unit in a successor logical device in the target snapshot tree,
removing the dependency of the target data-storage unit on the corresponding data-storage unit in the successor logical device; and
when a corresponding data-storage unit of a predecessor logical device in the target snapshot tree depends on the target data-storage unit,
partially removing the dependency of the corresponding data-storage unit of predecessor logical device on the target data-storage unit.

18. The data-storage system of claim 10 further comprising executing a read operation directed to the target snapshot tree while the background-copy process is executing by:
finding a description of the target-snapshot-tree data-storage unit corresponding to the data to be read;
when the description of the target-snapshot-tree data-storage unit includes an indication that the target-snapshot-tree data-storage unit has been modified, returning data from the target-snapshot-tree data-storage unit; and
when the description of the target-snapshot-tree data-storage unit includes an indication that the target-snapshot-tree data-storage unit has not been modified, returning data from a source-snapshot-tree data-storage unit corresponding to the target-snapshot-tree data-storage unit.

* * * * *

UNITED STATES PATENT AND TRADEMARK OFFICE
CERTIFICATE OF CORRECTION

| | | |
|---|---|---|
| PATENT NO. | : 7,788,244 B2 | Page 1 of 1 |
| APPLICATION NO. | : 11/888581 | |
| DATED | : August 31, 2010 | |
| INVENTOR(S) | : Xia Xu et al. | |

It is certified that error appears in the above-identified patent and that said Letters Patent is hereby corrected as shown below:

In column 18, line 10, in Claim 1, after "device" delete "with respect to the first logical device".

In column 20, line 49, in Claim 10, after "device" delete "with respect to the first logical device".

Signed and Sealed this
Fifth Day of April, 2011

David J. Kappos
*Director of the United States Patent and Trademark Office*